US011236237B2

(12) United States Patent
Coogan et al.

(10) Patent No.: US 11,236,237 B2
(45) Date of Patent: *Feb. 1, 2022

(54) FLAME RETARDANT VAPOR RETARDING MEMBRANES

(71) Applicant: CertainTeed LLC, Malvern, PA (US)

(72) Inventors: Timothy Jerome Coogan, West Boylston, MA (US); Jeffrey H. Peet, Southborough, MA (US); Nicholas David Orf, Natick, MA (US)

(73) Assignee: CERTAINTEED LLC, Malvern, PA (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/023,595

(22) Filed: Jun. 29, 2018

(65) Prior Publication Data

US 2019/0002707 A1 Jan. 3, 2019

Related U.S. Application Data

(60) Provisional application No. 62/527,596, filed on Jun. 30, 2017.

(51) Int. Cl.
| | | |
|---|---|---|
| C09D 5/18 | (2006.01) | |
| C09D 119/02 | (2006.01) | |
| B05D 5/08 | (2006.01) | |
| D06N 3/00 | (2006.01) | |
| D06M 15/263 | (2006.01) | |
| D06M 11/45 | (2006.01) | |
| D06M 11/74 | (2006.01) | |
| D06M 15/233 | (2006.01) | |
| D06M 23/08 | (2006.01) | |
| D06M 11/72 | (2006.01) | |
| D06N 3/04 | (2006.01) | |
| C08J 7/04 | (2020.01) | |
| C08J 7/048 | (2020.01) | |
| C08J 7/05 | (2020.01) | |
| C08J 7/056 | (2020.01) | |
| D06M 101/20 | (2006.01) | |
| C09K 21/00 | (2006.01) | |
| C08K 3/04 | (2006.01) | |

(Continued)

(52) U.S. Cl.
CPC ............... *C09D 5/18* (2013.01); *B05D 5/08* (2013.01); *C08J 7/048* (2020.01); *C08J 7/0427* (2020.01); *C08J 7/05* (2020.01); *C08J 7/056* (2020.01); *C09D 119/02* (2013.01); *D06M 11/45* (2013.01); *D06M 11/72* (2013.01); *D06M 11/74* (2013.01); *D06M 15/233* (2013.01); *D06M 15/263* (2013.01); *D06M 23/08* (2013.01); *D06N 3/0011* (2013.01); *D06N 3/0038* (2013.01); *D06N 3/0063* (2013.01); *D06N 3/045* (2013.01); *B05D 2401/20* (2013.01); *C08J 2323/12* (2013.01); *C08J 2419/02* (2013.01); *C08K 3/042* (2017.05); *C08K 3/346* (2013.01); *C08K 2003/2227* (2013.01); *C09K 21/00* (2013.01); *D06M 2101/20* (2013.01); *D06M 2200/30* (2013.01); *D06N 2209/067* (2013.01)

(58) Field of Classification Search
CPC ...... B05D 5/08; B05D 2401/20; C08J 7/0427; C08J 2419/02; C08J 2323/12; C08K 3/042; C08K 3/346; C08K 2003/2227; C09D 5/18; C09D 119/02; C09K 21/00; D06M 15/263; D06M 11/45; D06M 11/74; D06M 15/233; D06M 23/08; D06M 11/72; D06M 2101/20; D06M 2200/30; D06N 3/0011; D06N 3/045; D06N 3/0063; D06N 3/0038; D06N 2209/067

See application file for complete search history.

(56) References Cited

U.S. PATENT DOCUMENTS

| | | |
|---|---|---|
| 4,818,600 A | 4/1989 | Braun |
| 6,808,772 B2 | 10/2004 | Kunzel |
| 7,851,052 B2 | 12/2010 | Caldwell |

(Continued)

FOREIGN PATENT DOCUMENTS

| | | |
|---|---|---|
| KR | 10-2013-0019653 A | 2/2013 |
| KR | 10-1723600 B1 | 4/2017 |

(Continued)

OTHER PUBLICATIONS

International Search Report and Written Opinion issued in co-pending International Patent Application No. PCT/US2018/040315, ISA/KR Korean Intellectual Property Office, dated Nov. 16, 2018, 12 pages.

(Continued)

*Primary Examiner* — Patrick D Niland
(74) *Attorney, Agent, or Firm* — McDonnell Boehnen Hulbert & Berghoff LLP

(57) ABSTRACT

The present disclosure relates generally to flame retarding building materials and methods for making them. More particularly, the present disclosure relates to flame retarding building materials that have both flame retardant character and desirable water vapor permeability values. In one embodiment, the disclosure provides a flame retardant vapor retarding membranes comprising: a building material substrate sheet having a melt viscosity of about 1 Pa·s to about 100,000 Pa·s at about 300° C. at 1 rad/s; and a polymeric coating layer disposed on the building material substrate layer, wherein the coating layer has a melt viscosity of about 1 Pa·s to about 100,000 Pa·s at about 300° C. at 1 rad/s.

22 Claims, 2 Drawing Sheets

(51) Int. Cl.
  *C08K 3/34* (2006.01)
  *C08K 3/22* (2006.01)

(56) References Cited

U.S. PATENT DOCUMENTS

| | | | |
|---|---|---|---|
| 8,461,067 | B2 | 6/2013 | Smith |
| 2003/0012954 | A1 | 1/2003 | Schauer |
| 2005/0119391 | A1 | 6/2005 | Mason |
| 2005/0284338 | A1 | 12/2005 | Dwyer |
| 2007/0294976 | A1 | 12/2007 | Fay |
| 2008/0050565 | A1 | 2/2008 | Gross |
| 2008/0176050 | A1 | 7/2008 | Lintz |
| 2009/0107080 | A1 | 4/2009 | Bowe |
| 2010/0146887 | A1 | 6/2010 | Wiker |
| 2011/0274856 | A1 | 11/2011 | Koenig |
| 2012/0059098 | A1* | 3/2012 | Monden ............. C08K 5/42 524/161 |
| 2012/0231170 | A1 | 9/2012 | Cao |
| 2015/0176211 | A1* | 6/2015 | Knapp ............. D21H 19/40 428/413 |
| 2016/0185994 | A1 | 6/2016 | Peet |
| 2016/0244599 | A1* | 8/2016 | Kurokawa ......... C08L 23/0815 |
| 2019/0002707 | A1 | 1/2019 | Coogan |
| 2019/0003174 | A1* | 1/2019 | Coogan ............. C09D 109/08 |

FOREIGN PATENT DOCUMENTS

| | | |
|---|---|---|
| WO | 2008119887 A1 | 10/2008 |
| WO | 2013164646 A1 | 11/2013 |
| WO | 2015157278 A1 | 10/2015 |

OTHER PUBLICATIONS

Copending U.S. Appl. No. 16/022,847, filed Jun. 29, 2018.

* cited by examiner

FLAME RETARDANT VAPOR RETARDING MEMBRANES

CROSS-REFERENCE TO RELATED APPLICATIONS

This application claims the benefit of priority of U.S. Provisional Patent Application No. 62/527,596, filed Jun. 30, 2017, which is hereby incorporated herein by reference in its entirety.

BACKGROUND OF THE DISCLOSURE

1. Field of the Disclosure

The present disclosure relates generally to flame retardant building materials and methods for making them. More particularly, the present disclosure relates to membrane materials that have both flame retardant properties and desirable variable water vapor permeability.

2. Technical Background

Materials in a wall cavity are desirably flame resistant. For example, in the United States, certain especially desirable materials are rated Class A in the ASTM E84 flame test. Similarly, in Europe, certain especially desirable materials in a wall cavity achieve a class E rating by meeting the test criteria in the ISO EN 11925-2:2002 standard. In this test, a flame (similar to a Bunsen burner) is applied to the vertically-held product for 15 seconds; if the material ignites, the fire must extinguish within 5 seconds of the flame removal while having spread vertically less than 150 mm. Building materials desirably meet the 5 seconds/150 mm values when the flame is applied to one side of the material (e.g., the coating side or the substrate side, and desirably both) or from the edge (in contact with both sides and any intermediate layers). Of course, some materials may be suitably fire resistant even if it meets this standard with respect to the coating side of the material, even if it does not meet it in all manners. Many currently available products that meet the flame retardancy standards suffer from the ability to maintain desired water vapor permeability at a low or variable relative humidity. Their interior moisture barriers usually provide low permeability across all conditions (i.e., the full range of relative humidity), but do not allow for high permeability during high relative humidity (i.e., they do not allow moisture to escape the wall cavity during humid climates). On the other hand, many of the currently available "smart vapor retardant" products that provide variable vapor permeability are usually extruded thermoplastic films or laminates of extruded thermoplastic film. In some cases, even if one layer of these products is modified to be flame retardant, it will still fail the retardancy standards due to the flammability of the other layer. While there are a few laminated thermoplastic extruded membrane materials known to meet the criteria for the 15-second flame application test in ISO EN 11925-2:2002 (i.e. class E flame retardant), such materials can be relatively expensive to fabricate. While coating (e.g., from aqueous media onto a substrate sheet, such as by coating from a polymer dispersion (e.g., polymer latex) or an aqueous polymer emulsion) is a much less expensive fabrication methodology that can utilize lower cost raw materials, the flame resistance tests have proven to be extremely difficult to pass for coated membrane materials. In many cases, a product having a coating that it is itself Class E flame retardant coated on a non-woven substrate sheet that is itself Class E flame-retardant will nonetheless fail to meet the Class E standard.

Therefore, innovative coating solutions are therefore needed to provide novel building materials that can provide both the desired flame retardant properties and desired water vapor permeability, particularly at variable relative humidity, at a low cost.

SUMMARY OF THE DISCLOSURE

The present inventors have found simple and cost-efficient materials that have good flame retardant properties but also provide water vapor permeability, particularly at variable relative humidity.

Thus, in one aspect, the present disclosure provides a flame retardant vapor retarding membrane, comprising:
  a building material substrate sheet having a melt viscosity of about 1 Pa·s to about 100,000 Pa·s measured at 300° C. and 1 rad/s; and
  a polymeric coating layer coated on the substrate sheet, the polymeric coating layer having a melt viscosity of about 1 Pa·s to about 100,000 Pa·s measured at 300° C. and 1 rad/s.

In another aspect, the present disclosure provides a method for making a flame retardant vapor retarding membrane, the method comprising:
  providing a building material substrate sheet having a melt viscosity of about 1 Pa·s to about 100,000 Pa·s at measured at 300° C. and 1 rad/s; and
  coating a polymeric coating layer onto the substrate sheet, the polymeric coating layer having a melt viscosity of about 1 Pa·s to about 100,000 Pa·s measured at 300° C. and 1 rad/s.

The present disclosure provides vapor membranes that can have a high degree of flame retardance. For example, in certain embodiments, a vapor retarding membrane as otherwise described herein has a Flame Spread value of less than 150 mm, as measured by the flame test procedures of EN ISO 11925-2. In certain such embodiments, the material self-extinguishes after no more than 5 seconds after the flame is removed from the substrate.

In certain embodiments, the vapor retarding membranes of the disclosure are configured to have a low water vapor permeance, for example, no more than about 2.5 Perm (e.g., no more than about 1 Perm), at 25% relative humidity, as tested by ASTM E96 at 23° C. In certain such embodiments, the vapor retarding membranes are configured to have a low permeance over a wide range of humidities. In other embodiments, the disclosure provides a flame retardant vapor retarding membrane that is a so-called "smart vapor retarding" membrane. For example, in certain embodiments the disclosure provides a vapor retarding membrane that is configured to have a water vapor permeability of no more than about 2.5 Perm (e.g., no more than 1 Perm) at 25% relative humidity but a water vapor permeability of at least about 8 Perms (e.g., at least about 12 Perms, or at least about 15 Perms) at 95% relative humidity. In certain embodiments, the disclosure provides a vapor retarding membrane that is configured to have a water vapor permeability of no more than 6 Perms (e.g., no more than 4 Perms) at 45% relative humidity, at least about 5 Perms (e.g., at least about 8 Perms, at least about 12 Perms, at least about 15 Perms, or at least about 20 Perms) at 95% relative humidity. In certain such embodiments, the membrane is configured to have a water vapor permeability of no more than about 1 Perm at 25% relative humidity. Water vapor permeability values are tested as described in ASTM E96 at 23° C. As used herein, a Perm is a United States Perm.

The disclosure also provides vapor retarding membranes made by the methods described herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description, serve to explain the principles and operation of the disclosure.

DETAILED DESCRIPTION

Figure 1:
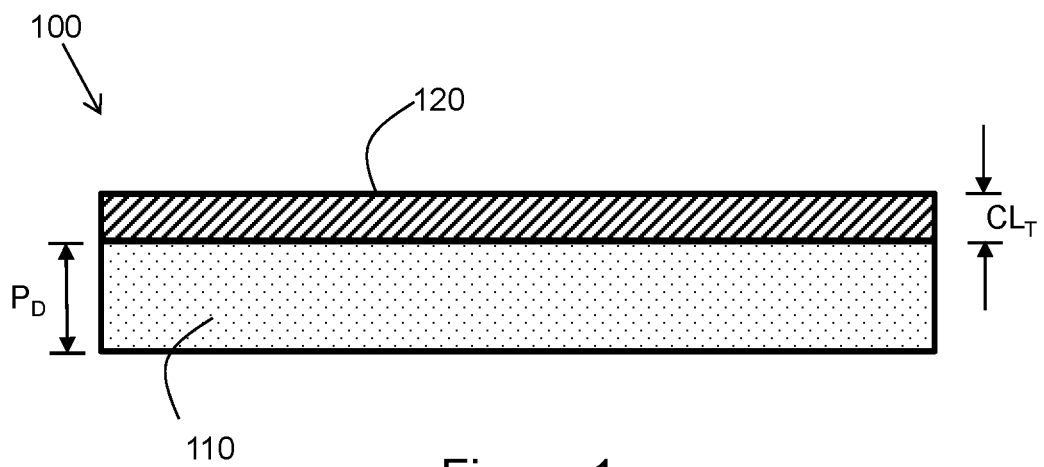
FIG. 1 is a partial schematic cross-sectional view of a flame retardant vapor retarding membrane according to one embodiment of the disclosure.

Before the disclosed processes and materials are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All percentages, ratios and proportions herein are by weight, unless otherwise specified.

In view of the present disclosure, the processes and active materials described herein can be configured by the person of ordinary skill in the art to meet the desired need. In certain desirable aspects of the disclosure, the disclosed materials, methods, and apparati provide cost-efficient improvements in building materials that have improved fire retardant properties and also low water vapor permeability at low RH (e.g., at about 25% RH) while having high water vapor permeability at high RH (e.g., at about 75-95% RH).

Thus, one aspect of the disclosure provides a flame retardant vapor retarding membrane, including
a building material substrate sheet having a melt viscosity of about 1 Pa·s to about 100,000 Pa·s at measured at 300° C. and 1 rad/s; and
a polymeric coating layer coated on the substrate sheet, the polymeric coating layer having a melt viscosity of about 1 Pa·s to about 100,000 Pa·s measured at 300° C. and 1 rad/s,
wherein the flame retardant vapor retarding membrane is configured to have a water vapor permeability of no more than about 2.5 Perm at 25% relative humidity (e.g., no more than about 1 Perm), as tested by ASTM E96 at 23° C. In certain such embodiments, the flame retardant vapor retarding membrane is configured to have a water vapor permeability of at least about 5 Perms (e.g., at least about 8 Perms, at least about 12 Perms, at least about 15 Perms, or at least about 20 Perms) at 95% relative humidity, as tested by ASTM E96 at 23° C. Surprisingly, the present inventors have determined that the use of a building material substrate sheet that is flame retardant on its own together with a polymeric coating layer that is flame retardant on its own does not necessarily result in a flame-retardant coated membrane, for example, one meeting the EN ISO 13501-1: 2017 criteria for Class E rating. The present inventors have determined that vapor retarding membranes including a polymeric coating layer having a melt viscosity as described herein coated onto a building material substrate sheet having a melt viscosity as described herein can be made to be especially flame retardant, as both layers can melt and run away from flame in order to deny the fire the necessary fuel. Moreover, the present inventors have determined that, in certain embodiments, the polymeric coating layer can have a desired viscosity despite the fact that it is filled with a particulate inorganic material that is not itself meltable at 300° C. The polymeric coating layer can be selected by the person of ordinary skill in the art based on the present disclosure to provide the vapor retarding membrane with suitable vapor retarding properties at various relative humidities.

One embodiment of a flame retardant vapor retarding membrane of the disclosure is shown in partial schematic cross-sectional view in FIG. 1. Here, membrane 100 is shown including a building material substrate sheet 110 having a polymeric coating layer 120 coated thereon. The exact thickness of the building material substrate sheet 110 and the polymeric coating layer 120 can vary, but in many cases the thickness of the building material substrate layer 110 will be of a similar thickness as the thickness of the polymeric coating layer 120 (e.g. within 30-300% of the thickness of the polymeric coating layer. While the thickness of the polymeric coating layer 120 is shown as being substantially uniform in FIG. 1, such uniformity is not required. In particular, so long as the thickness of the polymeric coating layer 120 is effective to provide the desired variable water vapor permeability values, the thickness need not be uniform in every area of the building material substrate sheet 110.

The building material substrate sheet can be formed from a variety of materials, as the person of ordinary skill in the art will appreciate. As described above, the building material substrate sheet has a melt viscosity of about 1 Pa·s to about 100,000 Pa·s measured at 300° C. and 1 rad/s. The building material substrate sheet can have a variety of melt viscosity values; the person of ordinary skill in the art, based on the present disclosure, will select a material having an appropriate melt viscosity in conjunction with other desirable properties for use as a vapor retarding membrane. In various embodiments of the flame retardant vapor retarding membranes as otherwise described herein, the building material substrate sheet has a melt viscosity of about 10 Pa·s to about 100,000 Pa·s, or about 100 Pa·s to about 100,000 Pa·s, or about 1000 Pa·s to about 100,000 Pa·s, or about 10,000 Pa·s to about 100,000 Pa·s, or about 1 Pa·s to about 50,000 Pa·s, or about 10 Pa·s to about 50,000 Pa·s, or about 100 Pa·s to about 50,000 Pa·s, or about 1000 Pa·s to about 50,000 Pa·s, or about 1 Pa·s to about 25,000 Pa·s, or about 10 Pa·s to about 25,000 Pa·s, or about 100 Pa·s to about 25,000 Pa·s, or about 1000 Pa·s to about 25,000 Pa·s, or about 1 Pa·s to about 10,000 Pa·s, or about 10 Pa·s to about 10,000 Pa·s, or about 100 Pa·s to about 10,000 Pa·s, or about 1000 Pa·s to about 10,000 Pa·s, or about 1 Pa·s to about 1000 Pa·s, or about 10 Pa·s to about 1000 Pa·s, as measured at 300° C. and 1 rad/s. Melt viscosities as described herein are measured by parallel plate rotational rheology (i.e., measured within the viscoelastic regime). In certain embodiments as otherwise described herein, for example, the building material substrate sheet has a melt viscosity in the range of about 1 to about 10,000 Pa·s, as measured at 300° C. and 1 rad/s. In other embodiments as otherwise described herein, for example, the building material substrate sheet has a melt viscosity in the range of about 10 to about 10,000 Pa·s, as measured at 300° C. and 1 rad/s. In certain embodiments as otherwise described herein, for example, the building material substrate sheet has a melt viscosity in the range of about 1 to about 25,000 Pa·s, as measured at 300° C. and 1 rad/s. In other embodiments as otherwise described herein, for example, the building material substrate sheet has a melt viscosity in the range of about 10 to about 25,000 Pa·s, as measured at 300° C. and 1 rad/s. In other embodiments as otherwise described herein, for example, the building material substrate sheet has a melt viscosity in the range of about 20 to about 500 Pa·s, or about 200 to about 5000 Pa·s, as measured at 300° C. and 1 rad/s. In other embodiments as otherwise described herein, for example, the building material substrate sheet has a melt viscosity in the range of about 100 Pa·s to about 10,000 Pa·s, or about 1000 Pa·s to about 10,000 Pa·s, as measured at 300° C. and 1 rad/s. In other embodiments as otherwise described herein, for example, the building material substrate sheet has a melt viscosity in the range of about 100 Pa·s to about 25,000 Pa·s, or about 1000 Pa·s to about 25,000 Pa·s, as measured at 300° C. and 1 rad/s.

Based on the disclosure herein, the person of ordinary skill in the art will select an appropriate building material substrate sheet material for use in the flame retardant vapor retarding membranes described herein. The building material substrate sheet can be porous or contain a pore structure, such that the polymeric coating layer can be partially disposed within the pore structure of the substrate, as will be discussed in more detail below. For example, in certain embodiments of the flame retardant vapor retarding membranes as otherwise described herein, the building material substrate sheet is a sheet of fabric, i.e., having pores formed in the sheet. In certain such embodiments, the fabric is a woven fabric, for example, woven from thermoplastic fibers. In particular embodiments, the building material substrate can include a non-woven material. Particular non-woven materials can include spun bond or point bond fabrics. For example, in certain embodiments of the vapor retarding membranes as otherwise described herein, the building material substrate is a non-woven polypropylene fabric, e.g., a point-bond polypropylene non-woven fabric. Other non-woven fabrics suitable for use in various embodiments of the vapor retarding membranes as otherwise described herein include nylon non-woven fabrics, poly(ethylene terephthalate) non-woven fabrics, other polyester non-woven fabrics, polystyrene non-woven fabrics, acrylonitrile/butadiene/styrene copolymer non-woven fabrics, and polyethylene non-woven fabrics. In other embodiments, a perforated thermoplastic film can be used as the building material substrate sheet, e.g., a perforated polypropylene film, a perforated nylon film, a perforated PET film, a perforated polystyrene film, a perforated acrylonitrile/butadiene/styrene copolymer film, a perforated polyester film, or a perforated polyethylene film. The building material substrate sheet may itself be made from multiple sublayers of material, as the person of ordinary skill in the art would appreciate; desirably such a sheet would have pores extending through the sheet. Without intending to be bound by theory, the inventors believe that use of a porous substrate sheet can have two advantages: first, it can simplify the provision of desirable vapor retarding behavior to the overall membrane, and second, the void space can allow space for material to melt and move away from the flames when heated by flame, meaning that coatings with higher melt viscosities may be used than when a non-porous material is used as the substrate.

As described above, coated on the building material substrate sheet is a polymeric coating layer. The polymeric coating layer can be selected by the person of ordinary skill in the art based on the disclosure herein and based on the identity of the building material substrate sheet to provide desired water vapor permeability values to the flame retardant vapor retarding membranes of the disclosure. For additional information regarding vapor retarding coatings, the person of ordinary skill in the art will refer to U.S. Patent Application Publication no. 2016/0185994, which is hereby incorporated herein by reference in its entirety. Notably, the coating layer is not a polymer extrudate or otherwise preformed thermoplastic polymer sheet that is, for example, laminated to the substrate sheet. Rather, it is a material that is coated onto the substrate sheet, e.g., by a conventional coating process, such as from a liquid (e.g., aqueous) solution or a suspension, such as a polymer emulsion or polymer dispersion (i.e., polymer latex).

The polymeric coating layer can be formed from a variety of materials, as the person of ordinary skill in the art will appreciate, and as described in more detail below. As described above, the polymeric coating layer has a melt viscosity of about 1 Pa·s to about 100,000 Pa·s measured at 300° C. and 1 rad/s. The polymeric coating layer can have a variety of melt viscosity values; the person of ordinary skill in the art, based on the present disclosure, will select a material having an appropriate melt viscosity in conjunction with other desirable properties for use as a vapor retarding membrane. In various embodiments of the flame retardant vapor retarding membranes as otherwise described herein, the polymeric coating layer has a melt viscosity of about 10 Pa·s to about 100,000 Pa·s, or about 100 Pa·s to about 100,000 Pa·s, or about 1000 Pa·s to about 100,000 Pa·s, or about 10,000 Pa·s to about 100,000 Pa·s, or about 1 Pa·s to about 50,000 Pa·s, or about 10 Pa·s to about 50,000 Pa·s, or about 100 Pa·s to about 50,000 Pa·s, or about 1000 Pa·s to about 50,000 Pa·s, or about 1 Pa·s to about 25,000 Pa·s, or about 10 Pa·s to about 25,000 Pa·s, or about 100 Pa·s to about 25,000 Pa·s, or about 1000 Pa·s to about 25,000 Pa·s, or about 1 Pa·s to about 10,000 Pa·s, or about 10 Pa·s to about 10,000 Pa·s, or about 100 Pa·s to about 10,000 Pa·s, or about 1000 Pa·s to about 10,000 Pa·s, or about 1 Pa·s to about 5000 Pa·s, or about 10 Pa·s to about 5000 Pa·s, or about 100 Pa·s to about 5000 Pa·s, or about 1000 Pa·s to about 5000 Pa·s, or about 1 Pa·s to about 1000 Pa·s, or about 10 Pa·s to about 1000 Pa·s, as measured at 300° C. and 1 rad/s. In certain embodiments as otherwise described herein, for example, the polymeric coating layer has a melt viscosity in the range of about 1 to about 25,000 Pa·s, or about 100 to about 25,000 Pa·s, as measured at 300° C. and 1 rad/s. In certain embodiments as otherwise described herein, for example, the polymeric coating layer has a melt viscosity in the range of about 1 to about 10,000 Pa·s, or about 100 to about 10,000 Pa·s, as measured at 300° C. and 1 rad/s. In other embodiments as otherwise described herein, for example, the polymeric coating layer has a melt viscosity in the range of about 10 to about 1000 Pa·s, or about 100 to about 1000 Pa·s, as measured at 300° C. and 1 rad/s. In other embodiments as otherwise described herein, for example, the polymeric coating layer has a melt viscosity in the range of about 20 to about 500 Pa·s, or about 200 to about 5000 Pa·s. as measured at 300° C. and 1 rad/s. In other embodiments as otherwise described herein, for example, the polymeric coating layer has a melt viscosity in the range of about 50 to about 25,000 Pa·s, or about 100 to about 25,000 Pa·s. or about 200 to about 25,000 Pa·s, as measured at 300° C. and 1 rad/s.

The polymeric coating layer can include a continuous organic phase, optionally with a particulate phase dispersed therein. The continuous organic phase need not itself be absolutely homogenous; it can have different domains of different compositions. In certain embodiments of the flame retardant vapor retarding membranes as otherwise described herein, the continuous organic phase includes a hydrophobic polymer. As used herein, a hydrophobic polymer is a polymer with a weight-average molecular weight no less than 10 kDa, and a water absorption of less than 1%. Water absorption, as described herein, is measured gravimetrically at 100% relative humidity and 23° C. A variety of hydrophobic polymers can be used, such as a styrene butadiene copolymer such as a styrene butadiene rubber, an acrylic polymer or copolymer such as a styrene acrylic polymer, a vinyl acetate/ethylene copolymer, a poly(vinylidene chloride) polymer or copolymer, a poly(vinyl butyral), a polyolefin (such as polyethylene, polypropylene, polybutadiene, etc.), or a combination thereof. In certain embodiments of the flame retardant vapor retarding membranes as otherwise described herein, the hydrophobic polymer is coated onto the substrate sheet as from an aqueous dispersion of the hydrophobic polymer dispersed in water, such as a polymer latex, or from an aqueous emulsion of the hydrophobic polymer. In certain particular embodiments of the flame retardant vapor retarding membranes as otherwise described herein, the hydrophobic polymer is a styrene butadiene rubber (e.g., coated from a latex) or a styrene acrylic polymer (e.g., coated from a latex).

The hydrophobic polymer can be described by its percent (%) carboxylation. Percent carboxylation refers to the weight percentage of carboxylic acid (i.e., —COOH) in the polymer backbone. Accordingly, in certain particular embodiments of the flame retardant vapor retarding membranes as otherwise described herein, the hydrophobic polymer has a % carboxylation of essentially 0%, at least about 0.1%, or at least about 0.5%, or even at least about 1%. In particular embodiments of the flame retardant vapor retarding membranes as otherwise described herein, the hydrophobic polymer has a % carboxylation of no more than about 20%, or no more than about 15%, or no more than about 10%, or no more than about 5%, or even no more than about 3%. Moreover, in various embodiments of the flame retardant vapor retarding membranes as otherwise described herein, the hydrophobic polymer has a % carboxylation in a range of any of the minimums and maximums provided above, such as within a range of from about 0% to about 20%, or about 0.1% to about 15%, or about 0.5% to about 10%, or even about 1% to about 8%. In particular embodiments of the flame retardant vapor retarding membranes as otherwise described herein, the hydrophobic polymer can have a % carboxylation of about 0% in which case, the hydrophobic polymer would be essentially free of a carboxylic acid monomer in the polymer backbone. A particular advantage of the above mentioned % carboxylation values has been shown to be advantageous in achieving excellent permeability with relative humidity in combination with a separate hydrophilic component such as a hydrophilic polymer or a hydrophilic filler. Without wishing to be bound by theory, it is believed that at high levels of carboxylation the hydrophobic polymers tend to have too high a water vapor permeability at intermediate relative humidities.

The hydrophobic polymer can also be described by its glass transition temperature (Tg). As used herein, the glass transition temperature (Tg) of the hydrophobic polymer is measured by differential scanning calorimetry. Accordingly, in certain embodiments of the flame retardant vapor retarding membranes as otherwise described herein, the hydrophobic polymer has a glass transition temperature (Tg) of at least about −50° C., at least about −40° C., or even at least about −30° C. In certain embodiments of the flame retardant vapor retarding membranes as otherwise described herein, the hydrophobic polymer can have a glass transition temperature (Tg) of no more than about 35° C., or no more than about 25° C., or no more than about 25° C. or even no more than about 15° C. In certain embodiments, the hydrophobic polymer can have a glass transition temperature in a range of any of the minimums and maximums provided above, such as in a range of from about −30 to about 25° C., or about −30 to about 15° C., or even about −30 to about 0° C.

The amount of hydrophobic polymer in the coating layer can be varied by the person of ordinary skill in the art based on the present disclosure. However, in certain embodiments of the flame retardant vapor retarding membranes as otherwise described herein, the hydrophobic polymer makes up a relatively large proportion of the continuous organic phase of the polymeric coating layer. In certain embodiments of the flame retardant vapor retarding membranes as otherwise described herein, the hydrophobic polymer is present in the continuous organic phase of the polymeric coating layer in the amount of at least about 15 wt %, or at least about 25 wt %, or at least about 30 wt %, or at least about 40 wt %, or at least about 55 wt %, or at least about 70 wt %, or at least about 85 wt %, or at least about 95 wt %, based on the total weight of the continuous organic phase of the polymeric coating layer.

In certain embodiments of the flame retardant vapor retarding membranes as otherwise described herein, the hydrophobic polymer is present in the polymeric coating layer in an amount of about 15 wt % to about 90 wt %, or about 15 wt % to about 80 wt %, or about 15 wt % to about 65 wt %, or about 15 wt % to about 50 wt %, or about 15 wt % to about 35 wt %, or about 25 wt % to about 90 wt %, or about 25 wt % to about 80 wt %, or about 25 wt % to about 65 wt %, or about 25 wt % to about 50 wt %, or about 40 wt % to about 90 wt %, or about 30 wt % to about 90 wt %, or about 30 wt % to about 80 wt %, or about 30 wt % to about 65 wt %, or about 30 wt % to about 50 wt %, or about 40 wt % to about 90 wt %, or about 40 wt % to about 80 wt %, or about 40 wt % to about 65 wt %, or about 55 wt % to about 90 wt %, or about 55 wt % to about 80 wt %, or about 70 wt % to about 90 wt %. All wt % values described in this disclosure are on a dry weight basis, i.e., free of absorbed water.

The continuous organic phase of the polymeric coating layer can also include other components. For example, in certain embodiments of the flame retardant vapor retarding membranes as otherwise described herein, the continuous organic phase further comprises a lower molecular weight (i.e., less than 10 kDa) organic material, such as a wax or a low molecular weight polymer, having a melt viscosity less than or equal to the melt viscosity of the hydrophobic polymer. A variety of lower molecular weight organic materials can be used, e.g., polyethylene waxes, paraffin waxes, microcrystalline waxes, and other synthetic or natural waxes. Without intending to be bound by theory, the inventors believe that use of such low molecular weight additives can help to depress the melt viscosity of the polymeric coating layer, helping it to "run away" from flame when heated. The lower molecular weight material can be present in an amount, for example, up to 15 wt %, up to 10 wt %, or up to 5 wt % of the continuous organic phase.

As described in U.S. Patent Application Publication no. 2016/0185994, polymeric hydrophilic components can be included in the continuous organic layer. A polymeric hydrophilic component can absorb water, and thus increase permeability at high humidity. Polymeric hydrophilic components can thus be used to tune the water vapor permeability of the polymeric coating layer. As used herein, a polymeric hydrophilic component has a percent water absorption of at least 1% (for example, at least about 3%, at least about 5%, or even at least about 7%) as measured according to gravimetric measurements at 100% relative humidity and at 23° C. Thus, in certain embodiments of the flame retardant vapor retarding membranes as otherwise described herein, the coating layer further includes a polymeric hydrophilic component selected from one or more of polyvinyl alcohol, poly(vinyl pyrrolidone), starch, cellulose, polyacrylic acid and salts thereof, a highly carboxylated polymer (e.g., derived from a latex), amine polymers, polyethylene oxide, vinyl ether polymers, hydrolyzed polymers (e.g., hydrolyzed maleic anhydride) and polysaccharides. In certain embodiments of the flame retardant vapor retarding membranes as otherwise described herein, the coating layer includes a polymeric hydrophilic component (e.g., one or more of the components described above) in an amount up to about 30 wt. %, e.g., in an amount up to 20 wt %, or up to 10 wt %, or in the range of 0.1 wt % to 30 wt %, or 0.1 wt % to 20 wt %, or 0.1 wt % to 1 wt %, or 1 wt % to 30 wt %, or 1 wt % to 20 wt %, or 1 wt % to 10 wt %, or 4 wt % to 30 wt %, or 4 wt % to 20 wt %, or 4 wt % to 10 wt %, of the continuous organic phase.

However, the present inventors have noted that suitable permeability performance can be provided without using substantial amounts of polymeric hydrophilic components. Thus, in certain embodiments of the flame retardant vapor retarding membranes as otherwise described herein, the polymeric coating layer comprises less than about 4 wt %, or less than about 3 wt %, or less than about 2 wt %, or less than about 1 wt %, or less than about 0.5 wt %, or less than about 0.1 wt %, or is essentially free of polymeric hydrophilic components. In certain embodiments of the flame retardant vapor retarding membranes, the polymeric coating layer includes less than about 4 wt %, or less than about 3 wt %, or less than about 2 wt %, or less than about 1 wt %, or less than about 0.5 wt %, or less than about 0.1 wt %, or is essentially free of a polymeric hydrophilic components selected from polyvinyl alcohol, poly(vinyl pyrrolidone), starch, cellulose, polyacrylic acid and salts thereof, highly carboxylated polymers (e.g., derived from a latex), amine polymers, polyethylene oxide, vinyl ethers, highly hydrolyzed polymers (e.g., hydrolyzed maleic anhydride), polysaccharides and combinations thereof. In certain embodiments of the flame retardant vapor retarding membranes, the polymeric coating layer includes less than about 4 wt %, or less than about 3 wt %, or less than about 2 wt %, or less than about 1 wt %, or less than about 0.5 wt %, or less than about 0.1 wt %, or is essentially free of polyvinyl alcohol.

As described above, the polymeric coating layers of the flame retardant vapor retarding membranes of the present disclosure can optionally include a particulate filler dispersed in the continuous organic layer. Thus, in certain embodiments of the flame retardant vapor retarding membranes as otherwise described herein, the polymeric coating layer does not include a particulate filler.

However, in certain desirable embodiments of the flame retardant vapor retarding membranes as otherwise described herein, the polymeric coating layer includes a particulate filler dispersed in the continuous organic layer. The particulate filler can serve to absorb moisture and increase the permeability of the coating layer at elevated relative humidity by transmitting moisture through the coating layer. As described herein, the present inventors have determined that particulate fillers can help to provide desirable moisture permeability properties while used in amounts that do not interfere with flame retardance. That is, despite including a particulate filler, the polymeric coating layer can nonetheless have a desirably low melt viscosity such that it can "run away" from flame when heated.

In certain embodiments of the flame retardant vapor retarding membranes as otherwise described herein, the particulate filler has a median particle size (i.e., d50, $50^{th}$ percentile particle size) of about 0.5 to about 10 μm. In certain embodiments as otherwise described herein, the particulate filler has a median particle size (i.e., d50, $50^{th}$ percentile particle size) of about 1 to about 20 μm, or about 3 to about 20 μm, or about 5 to about 20 μm, or about 7 to about 20 μm, or about 1 to about 10 μm, or about 2 to about 10 μm, or about 5 to about 10 μm, or about 7 to about 10 μm, or about 1 to about 7 μm, or about 3 to about 7 μm, or about 4 to about 7 μm, or about 5 to about 7 μm, or about 1 to about 6 μm, or about 3 to about 6 μm, or about 4 to about 6 μm, or about 5 to about 6 μm, or about 1 to about 5 μm, or about 1 to about 4 μm, or about 1 to about 3 μm, or about 4.5 to about 6.5 μm, or about 4.8 to about 6.2 μm, or about 5.3 to about 5.7 μm. In certain such embodiments, the particulate filler has a d10 and a d90 value (i.e., $10^{th}$ percentile particle size and $90^{th}$ percentile particle size) within the range of about 0.3 to about 30 μm, or about 1 to about 20 μm, or about 3 to about 30 μm, or about 5 to about 20 μm, or about 7 to about 20 μm, or about 1 to about 10 μm, or about 3 to about 10 μm, or about 5 to about 10 μm, or about 7 to about 10 μm, or about 1 to about 7 μm, or about 3 to about 7 μm, or about 4 to about 7 μm, or about 5 to about 7 μm. Particle sizes as described herein are measured by laser diffraction, e.g., as in a Malvern Mastersizer 3000 Particle Analyzer. The present inventors have determined that use of particulate fillers with such sizes can provide the desired permeability behavior to the polymeric coating layer, without increasing the melt viscosity so much as to interfere with flame retardance.

A wide variety of particulate fillers can be used in flame retardant vapor retarding membranes described herein. In certain embodiments of the flame retardant vapor retarding membranes as otherwise described herein, the particulate filler is alumina trihydrate (also known as aluminum trihydrate, aluminum hydroxide, hydrated alumina, or ATH), kaolin, graphite (e.g., nonexpendable graphite), expandable graphite, calcium carbonate, barium sulfate, talc, calcium sulfate, sodium sulfate, silica, magnesium hydroxide, magnesium carbonate, antimony trioxide, clay, zinc borate, zinc oxide, zinc hydroxystannate, boehmite, aluminium diethyl phosphinate, ammonium polyphosphate, ammonium phosphate, melamine polyphosphate, melamine phosphate, melamine cyanurate, melamine, decabromodiphenyl ethane, or a combination thereof. For example, in certain embodiments of the flame retardant vapor retarding membranes as otherwise described herein, the particulate filler is alumina trihydrate, kaolin, graphite (e.g., nonexpendable graphite), expandable graphite, calcium carbonate, magnesium hydroxide, magnesium carbonate, antimony trioxide, clay, zinc borate, zinc oxide, zinc hydroxystannate, boehmite or a combination thereof. In certain particular embodiments of the flame retardant vapor retarding membranes as otherwise described herein, the particulate filler is kaolin, alumina trihydrate, or a combination thereof. The particulate filler can be selected by the person of ordinary skill in the art based on the present disclosure to provide the vapor retarding membrane with suitable vapor retarding properties at various relative humidities.

In certain embodiments of the flame retardant vapor retarding membranes as otherwise described herein, the particulate filler is an inorganic filler (e.g., alumina trihydrate, kaolin, graphite (e.g., nonexpendable graphite), expandable graphite, calcium carbonate, barium sulfate, talc, calcium sulfate, sodium sulfate, silica, magnesium hydroxide, magnesium carbonate, antimony trioxide, clay, zinc borate, zinc oxide, zinc hydroxystannate, boehmite as described above). In certain embodiments, the particulate filler is an inorganic hydrophilic filler. The inorganic hydrophilic filler may be described by its % water absorption. As used herein, the % water absorption is determined by gravimetric measurements as is well understood in the art. Percentage of water absorption will increase the permeability vs. relative humidity relationship, but if it is too high the hydrophilic component may become soluble and destabilize the polymeric coating layer. As used herein, an inorganic hydrophilic filler has a percent water absorption of at least 0.3% (e.g., at least about 1%, or at least about 3%), as measured at 100% relative humidity and at 23° C. In certain embodiments of the flame retardant vapor retarding membranes as otherwise described herein, the inorganic hydrophilic filler has a percent water absorption of no more than about 15%, or no more than about 10%, or even no more than about 7%, as measured at 100% relative humidity and at 23° C. Moreover, the inorganic hydrophilic filler can have a percent water absorption in a range of any of the minimums and maximums provided above, such as in a range of from about 1% to about 15%, or even about 0.3% to about 7%, etc.

In certain embodiments of the flame retardant vapor retarding membranes as otherwise described herein, the particulate filler can have a platelike morphology (such as that of Kaolin clay). This can increase the slope of the permeability vs. relative humidity relationship; without intending to be bound by theory, the inventors believe that this is due to the increased tortuosity of the path through the polymeric coating layer, which can allow coatings to be applied thinner and have superior performance.

In certain embodiments of the flame retardant vapor retarding membranes as otherwise described herein, the particulate filler is alumina trihydrate.

In certain embodiments of the flame retardant vapor retarding membranes as otherwise described herein, the particulate filler is a combination of kaolin and alumina trihydrate, e.g., 15-50 wt % kaolin and 50-85 wt % alumina trihydrate, e.g., about 70 wt % alumina trihydrate and about 30 wt % kaolin (i.e., as a percentage of the filler content).

As the person of ordinary skill in the art will appreciate, the particulate filler can provide a number of additional benefits. For example, the particulate filler may provide reinforcement in the polymeric coating layer, may provide additional flame retardancy in the polymeric coating layer (i.e., via a mechanism other than melt "run away", may improve the physical properties of the polymeric coating layer (e.g., decrease the coefficient of linear thermal expansion (CLTE) as compared to the CLTE of a cured composition without the filler), or may provide other desired features, e.g., may improve the overall viscosity of the composition to facilitate more uniform coating on a substrate.

Illustrative commercially available fillers include, but are not limited to, Bentolite®, Cloisite®, Nanofil®, Nanothix®, and Permont® fillers available from Southern Clay Products, Inc., Kamin brand kaolite from, or Snobrite brand kaolin from Unimin, Primatec brand kaolin from Sibelco, and Micral AM-550 ATH available from Huber Engineered Materials.

The person of ordinary skill in the art will select an appropriate amount of particulate filler to provide the desired flame retardance and vapor permeability to the membrane. In certain embodiments of the flame retardant vapor retarding membranes as otherwise described herein, the particulate filler is present in the polymeric coating layer in the amount up to about 85 wt % based on the total dry weight of the polymeric coating layer. For example, in various embodiments of the flame retardant vapor retarding membranes as otherwise described herein, the particulate filler is present in the polymeric coating layer in an amount up to about 75 wt %, or up to about 70 wt %, or up to about 60 wt %, or up to about 45 wt %, or up to about 30 wt %, or in the range of about 10 wt % to about 85 wt %, or about 20 wt % to about 85 wt %, or about 35 wt % to about 85 wt %, or about 50 wt % to about 85 wt %, or about 65 wt % to about 85 wt %, or about 10 wt % to about 75 wt %, or about 20 wt % to about 75 wt %, or about 35 wt % to about 75 wt %, or about 50 wt % to about 75 wt %, or about 10 wt % to about 70 wt %, or about 20 wt % to about 70 wt %, or about 35 wt % to about 70 wt %, or about 50 wt % to about 70 wt %, or about 10 wt % to about 60 wt %, or about 20 wt % to about 60 wt %, or about 35 wt % to about 60 wt %, about 10 wt % to about 45 wt %, or about 20 wt % to about 45 wt %, or about 10 wt % to about 30 wt %.

The present inventors have determined that alumina trihydrate (ATH) can provide especially beneficial combination of melt viscosity and permeability behavior. Accordingly, in certain embodiments of the flame retardant vapor retarding membranes as otherwise described herein, the particulate filler is alumina trihydrate. In certain such embodiments, the alumina trihydrate has a median particle size of about 1 to about 10 μm, e.g., about 1 to about 8 μm, or about 1 to about 6 μm, or about 3 to about 10 μm, or about 4 to about 8 μm, or about 3 to about 6 μm, or about 5 to about 6 μm, or about 5.3 to about 5.7 μm, optionally with d10/d90 values in the range of about 2 to about 10 μm, e.g., about 1 to about 8 μm, or about 1 to about 6 μm, or about 4 to about 10 μm, or about 4 to about 8 μm, or about 4 to about 6 μm. In certain such embodiments, the alumina trihydrate is present in an amount of about 5 wt % to about 60 wt %, for example, about 5 wt % to about 45 wt %, or about 5 wt % to about 30 wt %, or about 10 wt % to about 60 wt %, or about 10 wt % to about 45 wt %, or about 10 wt % to about 30 wt %, or about 20 wt % to about 60 wt %, or about 20 wt % to about 45 wt % of the coating layer.

Kaolin can also be advantageously used as a particulate filler in the flame retardant vapor retarding membranes of the disclosure. Thus, in certain embodiments of the flame retardant vapor retarding membranes as otherwise described herein, the particulate filler is kaolin. In certain such embodiments, the kaolin has a median particle size of about 1 to about 10 μm, e.g., about 1 to about 8 μm, or about 1 to about 6 μm, or about 3 to about 10 μm, or about 3 to about 8 μm, or about 3 to about 6 μm, optionally with d10/d90 values in the range of about 1 to about 10 μm, e.g., about 1 to about 8 μm, or about 1 to about 6 μm, or about 3 to about 10 μm, or about 3 to about 8 μm, or about 3 to about 6 μm. In certain such embodiments, the kaolin is present in an amount of about 5 wt % to about 60 wt %, for example, about 5 wt % to about 45 wt %, or about 5 wt % to about 30 wt %, or about 10 wt % to about 60 wt %, or about 10 wt % to about 45 wt %, or about 10 wt % to about 30 wt %, or about about 20 wt % to about 60 wt %, or about 20 wt % to about 45 wt % of the coating layer.

The inventors have determined that suitable coating layers can be formed substantially from a combination of hydrophobic polymer and particulate filler. For example, in certain embodiments of the flame retardant vapor retarding membranes as otherwise described herein, the combined content of the particulate filler and the hydrophobic polymer is at least about 80 wt % based on the total dry weight of the polymeric coating layer. In various embodiments of the flame retardant vapor retarding membranes as otherwise described herein, the combined content of the particulate filler and the hydrophobic polymer is at least about 85 wt %, or at least about 90 wt %, or at least about 95 wt %, or at least about 97 wt %, or at least about 98 wt %, or at least about 99 wt %, or about 100 wt % of the polymeric coating layer.

The ratio of hydrophobic polymer to particulate filler can vary in the polymeric coating layers of the flame retardant vapor retarding membranes of the disclosure. In certain embodiments of the flame retardant vapor retarding membranes as otherwise described herein, the hydrophobic polymer and the particulate filler are present in a weight ratio in the range of about 3:1 to about 1:3 (i.e., hydrophobic polymer:particulate filler), e.g., about 3:1 to about 1:2, or about 3:1 to about 1:1, or about 3:1 to about 1.5:1, or about 3:1 to about 2:1, or about 2:1 to about 1:2, or about 2:1 to about 1:1, or about 2:1 to about 1.5:1, or about 1.5:1 to about 1:3, or about 1.5:1 to about 1:2, or about 1.5:1 to about 1:1.

As the person of ordinary skill in the art will appreciate, the polymeric coating layer can optionally include a number of conventional components, such as one or more of viscosity modifiers, pigments, dyes, UV absorbers, slip additives, surfactants, defoamers, and deaerators. Such components are desirably present in a total amount of no more than 20 wt %, e.g., no more than 15 wt % or even no more than 10 wt % of the polymeric coating layer.

In certain embodiments of the flame retardant vapor retarding membranes as otherwise described herein, the polymeric coating layer also includes one or more biocidal agents. The biocidal agent can be effective to deter or prevent growth of organisms on the coating and/or surface of the substrate. In some embodiments, the biocidal agent can be effective as a fungicide, e.g., a moldicide, to prevent growth of mold or other fungus on the surface of the substrate. In other embodiments, the biocidal agent can be effective to prevent growth of bacteria, moss, algae or other organisms on the surface of the substrate. Where present, the biocidal agent may be present in an effective amount to deter or prevent growth of bio organisms. The biocidal agent, if present, is desirably present in an amount of no more than 5 wt %, e.g., no more than 2 wt % of the polymeric coating layer.

In certain embodiments of the flame retardant vapor retarding membranes as otherwise described herein, the polymeric coating layer can also include one or more stain-resistance additives. In some examples, the stain-resistance additive can act to reduce or prevent materials from being adsorbed into the coating and can generally assist in sealing the coating from penetration by materials other than water and gases. For example, the stain-resistance additive can provide oil resistance or oil repellency to prevent non-polar species from becoming trapped in the coating. The stain-resistance additives may also inhibit fading of the coating if exposed to heat, ultraviolet light or other forms of energy. Illustrative stain-resistance additives are commercially available, for example, from 3M (e.g., SRC-220, PM-5000, PM-1680, PM-4800) and AkzoNobel (e.g., Elotex® stain-resistance additives). The stain resistance additive, if present, is desirably present in an amount of no more than 5 wt %, e.g., no more than 2 wt % of the polymeric coating layer.

The coating layers can be provided at a variety of thicknesses to provide the desired vapor permeability behavior. In certain embodiments of the flame retardant vapor retarding membranes as otherwise described herein, the polymeric coating layer has a coat weight of at least about 10 g/m$^2$, at least about 20 g/m$^2$, or even at least about 40 g/m$^2$. In certain embodiments, the polymeric coating layer can have a coat weight of no greater than about 1000 g/m$^2$, or even no greater than about 500 g/m$^2$. For example, in certain embodiments of the vapor retarding membranes as otherwise described herein the coat weight of the polymeric coating layer is in the range of about 10 g/m$^2$ to about 1000 g/m$^2$, or about 20 g/m$^2$ to about 1000 g/m$^2$, or about 40 g/m$^2$ to about 1000 g/m$^2$, or about 10 g/m$^2$ to about 500 g/m$^2$, or about 20 g/m$^2$ to about 500 g/m$^2$, or about 40 g/m$^2$ to about 500 g/m$^2$. Typical rates for spray-coated polymer coating layers can be, for example, in the range of 150-300 g/m$^2$, e.g., 200-250 g/m$^2$.

As described above, the combination of a substrate and a polymeric coating layer that can each melt and "run away" from flame can provide a vapor retarding membrane with a high degree of flame retardance. For example, in certain embodiments, a vapor retarding membrane as otherwise described herein has a Flame Spread Index of less than 150 mm, as measured by the flame test procedures of EN ISO 11925-2, which is hereby incorporated herein by reference in its entirety. In certain such embodiments, the membrane self-extinguishes after no more than 5 seconds after the flame is removed from the substrate. In certain embodiments, a vapor retarding membrane as otherwise described herein has a Smoke Density of less than 300, as measured by the procedures of EN ISO 11925-2.

The person of ordinary skill in the art will appreciate that, in some embodiments, additional layers can be provided to the flame retardant vapor retarding membranes of the disclosure. However, any additional layers desirably also have a melt viscosity of about 1 Pa·s to about 100,000 Pa·s measured at 300° C. and 1 rad/s, (or any other melt viscosity values as described herein) so that they too can run away when heated by flame. And in certain embodiments, the only substantial layers of a vapor retarding membrane as otherwise described herein are the polymeric coating layer and the substrate sheet. In certain embodiments of the vapor retarding membranes as otherwise described herein, the polymeric coating layer and the substrate sheet make up at least 80%, at least 90%, or even at least 99% of the thickness of the vapor retarding membrane.

In certain embodiments as otherwise described herein, the flame retardant vapor retarding membrane of the disclosure can be characterized by its water vapor permeability as a function of relative humidity (RH). The water vapor permeability is a measure of the amount of water vapor that can pass through a membrane. The water vapor permeability values discussed herein are measured according to ASTM E96 at a temperature of 23° C. at the selected average RH values.

As described above, the flame retardant vapor retarding membranes of the disclosure are configured to have a water vapor permeability of no more than about 2.5 Perm (e.g., from about 0 Perm to about 2.5 Perm, or from about 0.1 Perm to about 2.5 Perm, or from about 0.5 Perm to about 2.5 Perm) at 25% relative humidity. In certain embodiments as otherwise described herein, the flame retardant vapor retarding membrane is configured to have a water vapor permeability of no more than about 1 Perm (e.g., from about 0 Perm to about 1 Perm, or from about 0.1 Perm to about 1 Perm, or from about 0.3 Perm to about 1 Perm) at 25% relative humidity.

In certain embodiments, the flame retardant vapor retarding membranes of the disclosure are so-called "smart vapor retarder" membranes. For example, in certain embodiments, a vapor retarding membrane of the disclosure is configured to have a water vapor permeability of no more than about 2.5 Perm at 25% relative humidity (e.g., as described above), a water vapor permeability of no more than 6 Perms at 45% relative humidity (e.g., no more than 4 Perms), and a water vapor permeability of at least about 5 Perms (e.g., at least about 8 Perms, at least about 12 Perms, at least about 15 Perms, or at least about 20 Perms) at 95% relative humidity, as tested by ASTM E96 at 23° C. In certain such embodiments, the flame retardant vapor retarding membranes of the disclosure can exhibit a desirable water vapor permeability at low, medium, and high relative humidities. For example, in certain embodiments, a flame retardant vapor retarding membrane as otherwise described herein is configured to have a water vapor permeability rating of about 0.3 Perms to about 6 Perms, about 1 Perm to about 6 Perms, about 0.3 Perms to about 4 Perms, or about 1 Perm to about 4 Perms at 45% average RH. In certain embodiments, a flame retardant vapor retarding membrane as otherwise described herein is configured to have a water vapor permeability rating in a range of from about 5 Perms to about 18 Perms (e.g., about 5 Perms to about 12 Perms) at 75% average RH. In certain embodiments, a flame retardant vapor retarding membrane as otherwise described herein is configured to have a water vapor permeability rating of at least about 12 Perms, e.g., at least about 20 Perms, at 95% average RH. In certain embodiments, the disclosure provides a vapor retarding membrane that is configured to have a water vapor permeability of no more than 6 Perms (e.g., no more than 4 Perms, about 0.3 to about 6 Perms, about 1 to about 6 Perms, about 0.3 to about 4 Perms, about 1 Perm to about 4 Perms) at 45% relative humidity; and at least about 5 Perms (e.g., at least about 8 Perms, at least about 12 Perms, at least about 15 Perms, or at least about 20 Perms) at 95% relative humidity. In certain such embodiments, the membrane is configured to have a water vapor permeability of no more than about 2.5 Perm (e.g., no more than about 1 Perm) at 25% relative humidity.

The flame retardant vapor retarding membranes of the disclosure can be configured to have various combinations of the water vapor permeability values provided above at the different relative humidities. For example, in certain embodiments, a flame retardant vapor retarding membrane as otherwise described herein is configured to have a water vapor permeability rating of about 2.5 Perm or less at 25% average RH (e.g., about 1 Perm or less); and a water vapor permeability rating of at least about 5 Perms (e.g., at least about 8 Perms, at least about 12 Perms, at least about 15 Perms or at least about 20 Perms) at 95% average RH. In certain embodiments, a flame retardant vapor retarding membrane as otherwise described herein is configured to have a water vapor permeability rating of about 2.5 Perm or less at 25% average RH (e.g., no more than about 1 Perm); a water vapor permeability rating of at least about 5 Perms (e.g., at least about 8 Perms, at least about 12 Perms, at least about 15 Perms or at least about 20 Perms at 95% average RH; and a water vapor permeability rating of about 6 Perms or less, at least about 4 Perms or less, or even about 2.5 Perms or less at 45% average RH. In certain further embodiments, a flame retardant vapor retarding membrane as otherwise described herein is configured to have a water vapor permeability rating of about 2.5 Perm or less at 25% average RH; a water vapor permeability rating of at least about 5 Perms (e.g., at least about 8 Perms, at least about 12 Perms, at least about 15 Perms, or at least about 20 Perms at 95% average RH; a water vapor permeability rating of about 6 Perms or less, about 4 Perms or less, or even about 2.5 Perms or less at 45% average RH; and a water vapor permeability rating in a range of from about 5 Perms to about 18 Perms (e.g., about 5 Perms to about 12 Perms) at 75% average RH.

It is to be understood, however, that the above recited combinations of water vapor permeability ratings at different relative humidities are exemplary combinations, and all possible combinations of the above-recited water vapor permeability ratings in the article are within the scope of the present disclosure. It is further noted that when an article displays the water vapor Perm rating noted above at different RH values, the change in Perm rating as humidity increases may, as noted herein, be linear or non-linear in a plot of the log of the permeability vs. the relative humidity.

In certain embodiments, the flame retardant vapor retarding membranes of the disclosure can exhibit an advantageous nail tear resistance. The nail tear resistance is a measure of the article's ability to prevent tearing after a puncture. As used herein, the nail tear resistance is measured according to EIN 12310-1. Accordingly, in certain embodiments, a flame retardant vapor retarding membrane as otherwise described has a nail tear resistance of at least about 1 N/5 cm, at least about 5 N/5 cm, or even at least about 10 N/5 cm.

In certain embodiments, the flame retardant vapor retarding membranes of the disclosure can exhibit an advantageous tensile strength. As used herein, tensile strength is measured according to EIN 12311-2. Accordingly, in certain embodiments, a flame retardant vapor retarding membrane as otherwise described has a tensile strength of at least about 10 N/5 cm, at least about 25 N/5 cm, or even at least about 40 N/5 cm. Further, in certain embodiments, a flame retardant vapor retarding membrane as otherwise described has a UV-aged tensile strength of at least about 10 N/5 cm, at least about 25 N/5 cm, or even at least about 40 N/5 cm. As used herein, UV-aged tensile strength is measured after UV aging for 180 hours at 0.5 W/m².

In certain embodiments, the flame retardant vapor retarding membranes of the disclosure can exhibit an advantageous tape adhesion. Tape adhesion is a measure of the ability of the article to stick to and release from an adhesive tape. As used herein, tape adhesion is measured according to EIN 12317-2. Accordingly, in certain embodiments, a flame retardant vapor retarding membrane as otherwise described has a tape adhesion of at least about 15 N/5 cm, at least about 20 N/5 cm, or even at least about 25 N/5 cm.

The flame retardant vapor retarding membranes of the disclosure can be provided in a variety of thicknesses. For example, in certain embodiments, a flame retardant vapor retarding membrane as otherwise described herein has a thickness of at least about 5 microns, at least about 10 microns, at least about 50 microns, at least about 100 microns, or even at least about 200 microns. In certain embodiments, a flame retardant vapor retarding membrane as otherwise described herein has a thickness no greater than about 1000 microns, no greater than about 750 microns, or even no greater than about 500 microns. In certain embodiments as otherwise described herein, the thickness of a flame retardant vapor retarding membrane of the disclosure is in the range of about 5 microns to about 1000 microns, or about 50 microns to about 1000 microns, or about 100 microns to about 1000 microns, or about 200 microns to about 1000 microns, or about 5 microns to about 750 microns, or about 50 microns to about 750 microns, or about 100 microns to about 750 microns, or about 200 microns to about 750 microns, or about 5 microns to about 500 microns, or about 50 microns to about 500 microns, or about 100 microns to about 500 microns, or about 200 microns to about 500 microns.

As the person of ordinary skill in the art will appreciate, the polymeric coating layer described above can be coated onto the building material substrate sheet in order to form a flame retardant vapor retarding membrane of the disclosure. A particular advantage of certain embodiments of the present disclosure is the ability of the polymeric coating layer described above to be used in conjunction with relatively porous building material substrate sheets, such as non-woven fabrics and perforated sheets. For example, the characteristics of certain embodiments of the coating layers described herein can substantially completely fill the void spaces within a building material substrate sheet, and thereby provide an effective coating for retarding water vapor. Other compositions that could potentially provide a variable water vapor permeability as a function of humidity could not be used with relatively porous building material substrates, as the composition would "bleed through" the substrate and lead to discontinuous and ineffective coatings due to the low viscosity of the coating fluid. The current inventors have surprisingly discovered a way to provide both an effective coating viscosity with a variable water vapor permeability enabling use on relatively porous building material substrates. However, it is to be understood that certain embodiments are not limited to the use of relatively porous building material substrate sheets.

Figure 2:
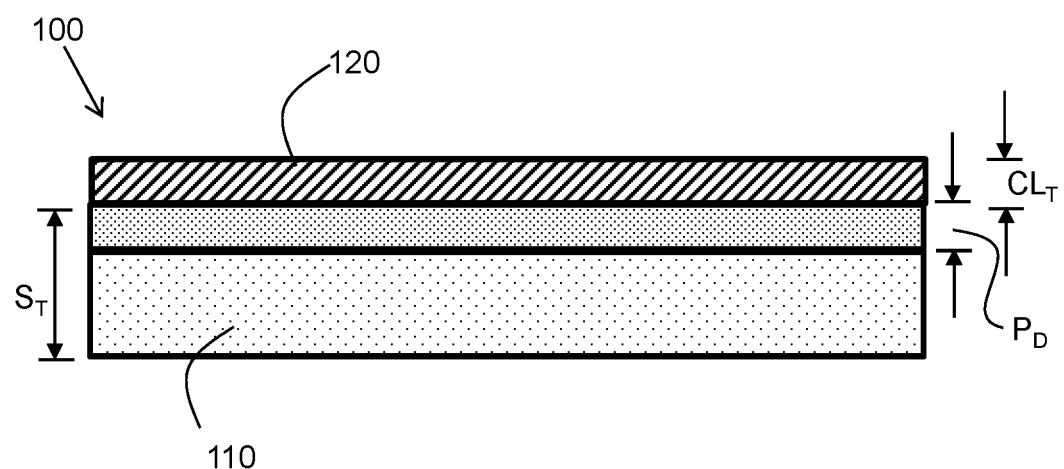
FIG. 2 is a partial schematic cross-sectional view of a flame retardant vapor retarding membrane according to another embodiment of the disclosure.

In certain embodiments, as illustrated in FIG. 2, the polymeric coating layer 120 can penetrate a building material substrate sheet 110 a desired depth $P_D$ into the building material substrate. In particular embodiments, the coating layer does not bleed through the entire building material substrate (e.g., it only partially bleeds into the building material substrate sheet). For example, in certain embodiments, the building material substrate sheet thickness ST can be greater than $P_D$ such that one major surface of the building material substrate sheet is essentially free of the polymeric coating layer. Further, the polymeric coating layer can have a thickness $CL_T$ as indicated in FIG. 2 measured from the outermost surface of the polymeric coating layer to the distance the polymeric coating layer penetrates into the building material substrate sheet.

Thus, in certain embodiments, the polymeric coating layer is partly embedded within the building material substrate sheet. In certain embodiments, the polymeric coating layer is embedded within the building material substrate sheet by about 5% to about 100% of the thickness of the polymeric coating layer, or by about 5% to about 50% of the thickness of the polymeric coating layer; or by about 5% to about 80%, or by about 5% to about 70%, or by about 5% to about 60%, or by about 5% to about 40%, or by about 30% to about 80%, or by about 30% to about 70%, or by about 30% to about 60%, or by about 30% to about 50%, or by at least about 1%, or at least about 5%, or even at least about 10% of the thickness of the polymeric coating layer.

In further embodiments, the polymeric coating layer can penetrate into the building material substrate sheet by no more than 95%, no more than 90%, or even no more than 85% of the thickness of the building material substrate sheet. In certain embodiments, the polymeric coating layer can penetrate into the building material substrate sheet by at least about 1%, or at least about 5%, or even at least about 10% of the thickness of the building material substrate sheet.

Figure 3:
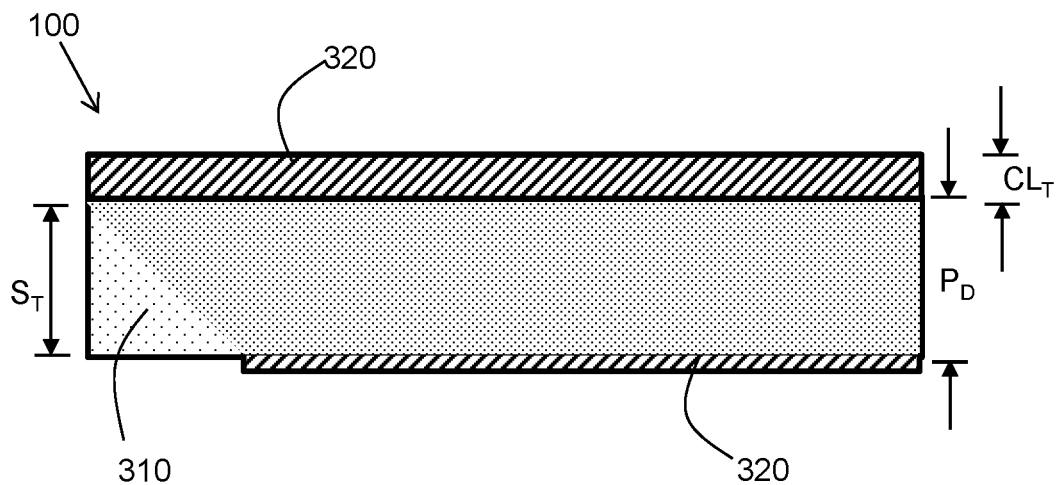
FIG. 3 is a partial schematic cross-sectional view of a flame retardant vapor retarding membrane according to another embodiment of the disclosure.

In other embodiments, the building material substrate sheet can be completely saturated such that the polymeric coating layer is disposed on both major surfaces of the building material substrate sheet. For example, the $P_D$ can be greater than or equal to the ST. Further, the polymeric coating layer can have a desirable thickness atop both major surfaces of the building material substrate sheet. FIG. 3 is cross-sectional schematic view of such an embodiment. Here, building material substrate sheet 310 is in the form of a porous sheet impregnated with polymeric coating material, such that the polymeric coating layer 320 is disposed on both major surfaces of the sheet 310.

In another aspect, the disclosure provides method for preparing a flame retardant vapor retarding membrane, for example, a vapor retarding membrane as otherwise described herein. The method includes:
 providing a building material substrate sheet having a melt viscosity of about 1 Pa·s to about 100,000 Pa·s at measured at 300° C. and 1 rad/s (e.g., any a building material substrate sheet as described herein); and
 coating a polymeric coating layer onto the substrate sheet, the polymeric coating layer having a melt viscosity of about 1 Pa·s to about 100,000 Pa·s measured at 300° C. and 1 rad/s (e.g., the polymeric coating layer being any polymeric coating layer as described herein),
the flame retardant vapor retarding membrane configured to have a water vapor permeability of no more than about 2.5 Perm at 25% relative humidity as tested by ASTM E96 at 23° C. The methods described herein can be used to make the vapor retarding membranes described herein.

The person of ordinary skill in the art will appreciate that a variety of building material substrates can be used in practicing the methods described herein, for example, the building material substrates described above. Similarly, a variety of polymeric coating materials can be used in practicing the methods described herein, for example, the coating materials described above.

The person of ordinary skill in the art will appreciate that the polymeric coating layer can be coated onto the building material substrate sheet in a variety of ways. The polymeric coating layer can be coated from a liquid dispersion (e.g., an aqueous polymer latex) or a liquid emulsion using polymer dispersion or polymer emulsion techniques. Advantageously, the present inventors have determined that aqueous coating technologies can be used to provide polymeric coating layers that can provide not only advantageous vapor retardance behavior but also acceptable fire retardance, at advantageously low cost and high process simplicity. A coating liquid containing the hydrophobic polymer and any filler, hydrophilic polymer and other additives dispersed in a volatile liquid (e.g., water), can be coated onto the building material substrate sheet by rolling (e.g., forward roll, reverse roll), roll to roll coating, slot die coating, mayer rod coating, knife coating, indirect gravure coating, spraying, or any other convenient method. The coated liquid can be allowed to cure by drying to provide the polymeric coating layer. The desired thickness of the polymeric coating layer can be built up in a single coat or through multiple coating steps, e.g., with at least partial drying of each coat between coating steps. The person of ordinary skill in the art can provide a coating liquid with a desired viscosity suitable to provide a desired process and thickness of polymeric coating layer.

Certain aspects of the disclosure are now explained further via the following non-limiting examples.

EXAMPLES

Samples were prepared and tested for flame retardancy. Samples were prepared by mixing the ingredients with a motorized cowles blade, or a homogenizer, or by hand for 5 minutes at room temperature. The coatings were applied by wound wire rod (Mayer rod) or by a slot die process at a thickness of approximately 75 microns.

The samples were tested in accordance with EN 13501-1 and EN ISO 11925-2. The article of the disclosure were tested according to the tests for the Euro Class E fire rating, which states that the product is "capable of resisting, for a short period, a small flame attack without substantial flame spread". In this test, a small flame is applied to the product for 15 seconds and then removed. The product must self-extinguish within 5 s from the flame being removed. At this point, the flame may not have spread more than 150 mm up the product. The Euro Class E test can be performed with the flame applied from one of three orientations: (a) flame to front (i.e., coated side), (b) flame to back (i.e., substrate sheet side), and (c) flame to edge. It is noted that a sample that does not meet the Euro Class E fire ratting by, for example, failing the Euro Class E test at one orientation (or even at two orientations) may still be suitable for use as a flame retardant vapor retarding membrane. For example, such sample may still qualify for Class A rating in the ASTM E84 flame test, which is less stringent than the Euro Class E test.

The articles of the disclosure were also tested for water vapor permeability values under ASTM E96 at 23° C. and at average relative humidities of 25% RH, 45% RH, 75% RH, and 95% RH. Specifically, samples were then sealed over either dry cups filled with desiccant to achieve the 25% and 45% average relative humidity conditions or sealed over wet cups filled with DI water to achieve the 75% and 95% RH conditions. The cups were placed in a humidity chamber at either 50% (for 25% or 75% average RH conditions) or 90% RH (for the 45% or 95% average RH conditions). For each condition, the cup was manually weighed seven times, once every day or automatically weighed every hour until six consecutive data points reach equilibrium by using the Gintronic Gravitest Permeability tester in accordance with ASTM E96.

Example 1

A polymeric coating layer of Example 1 is provided in Table 1. The wet wt % values for the components are based on total wet weight of the liquid formulation from which the polymeric coating layer was coated; the dry wt % for the components are based on total dry weight of the polymeric coating layer composition.

TABLE 1

| Component | Trade Name (Manufacturer) | Formulation (wet wt %) | Coating (dry wt %) |
|---|---|---|---|
| Styrene acrylic latex | Polidisp 7602 (Resiquimica) | 53.2 | 45.5% |
| Kaolin clay | Primatec (Sibelco) | 30.1 | 51.5% |
| Water | Tap water | 14.9 | — |
| TiO$_2$ | XFast White 0025 (BASF) | 0.58 | 1% |
| HAL stabilizer | Tinuvin 292 (BASF) | 0.19 | 0.3% |
| Dispersant | Tamol 1124 (Dow) | 0.90 | 1.4% |
| Defoamer | Surfynol DF-58 (Air Products) | 0.1 | 0.1% |

The polymeric coating composition of Example 1 was coated onto Radici 50, which is a 50 g/m$^2$ polypropylene non-woven sheet produced by RadiciGroup (Gandino, Italy). This article was tested, and its permeance was 0.99 Perm at 25% RH; 3 Perm at 45% RH; 12 Perm at 75% RH; 44.5 Perm at 95% RH. Certain target values listed in Table 2 are desirable values in certain applications, and do not limit the scope of the disclosure. Measured values are provided in Table 3.

TABLE 2

| Features | | Target Values | | Target after 180 h UV Aging at 0.5 W/m$^2$, 50° C. | Test Method |
|---|---|---|---|---|---|
| Diffusion-Equivalent Air Layer Thickness S$_d$ value (m) | | 0:50% RH, 23° C. | 3-5 | ≥2.5 | ASTM E96 |
| | | 50:93% RH: 23° C. | ≤1 | ≤1 | ASTM E96 |
| | | 0:75% RH, 23° C. | ≥2 | ≥2 | ASTM E96 |
| Mechanical Properties (GS20) | Max. Tensile Force (N/5 cm) | Longitudinal | ≥100 | ≥64 | EIN 12311-2 |
| | | Transversal | ≥100 | ≥58 | EIN 12311-2 |
| | Max. Tensile Elongation (%) | Longitudinal | ≥49 | ≥31 | EIN 12311-2 |
| | | Transversal | ≥55 | ≥28 | EIN 12311-2 |
| | Nail Tear Resistance (N) | Longitudinal | ≥60 | ≥25 | EIN 12310-1 |
| | | Transversal | ≥60 | ≥25 | EIN 12310-1 |

TABLE 2-continued

|  | Features | Target Values |  | Target after 180 h UV Aging at 0.5 W/m², 50° C. | Test Method |
|---|---|---|---|---|---|
| System Behavior | Resistance to Shearing (N/5 cm) | Longitudinal Transversal | >80 >40 | >80 >30 |  |
|  | Resistance to Peeling (N/5 cm) | Longitudinal Transversal | >30 >30 | Not specified Not specified |  |
|  | Resistance to Peeling on Support (N/5 cm) | Concrete Metal | >70 >60 | Not specified Not specified |  |
|  | Airtightness [m³/(m² · h · 50 Pa)] |  | 0 | 0 |  |

TABLE 3

|  | Features | Results |  | Results after 180 h UV Aging at 0.5 W/m², 50° C. | Test Method |
|---|---|---|---|---|---|
|  | Diffusion-Equivalent Air Layer Thickness $S_d$ value (m) | 0:50% RH, 23° C. 50:93% RH: 23° C. 0:75% RH, 23° C. | 3-5 ≤1 ≥2 | ≥2.5 ≤1 ≥2 | ASTM E96 ASTM E96 ASTM E96 |
| Mechanical Properties (GS20) | Max. Tensile Force (N/5 cm) | Longitudinal Transversal | 120 168 | 126 123 | EIN 12311-2 EIN 12311-2 |
|  | Max. Tensile Elongation (%) | Longitudinal Transversal | 71 73 | 80 50 | EIN 12311-2 EIN 12311-2 |
|  | Nail Tear Resistance (N) | Longitudinal Transversal | ≥60 85 | 52 | EIN 12310-1 EIN 12310-1 |
| System Behavior | Resistance to Shearing (N/5 cm) | Longitudinal Transversal | 100 | 122 |  |
|  | Resistance to Peeling (N/5 cm) | Longitudinal Transversal | 46 | Not specified Not specified |  |
|  | Resistance to Peeling on Support (N/5 cm) | Concrete Metal |  | Not specified Not specified |  |
|  | Airtightness [m³/(m² · h · 50 Pa)] |  | 0 | 0 |  |

Example 2

The formulation of Example 1 was modified to replace a part of the kaolin with different particulate fillers. The following grades of expandable graphite were tested: 220-50N and 160-50N expandable graphite grades from GrafTech International (both provided good flame retardant properties, but 220-50N performed slightly better), 3772 from Asbury Carbons (this expandable graphite gave good fire performance and it had a nominal particle size of >300 μm with an expansion ratio of 300 cm³/g), and a few smaller grades of expandable graphite from Asbury Carbons (the smaller grades had smaller expansion ratios, and they were not able to make the coating flame retardant). All the formulations listed as Ex. 2+5% exp graph were made with either 220-50N (GrafTech) or with 3772 (Asbury).

All samples were then tested for fire performance according to EN 13501-1 and EN ISO 11925-2 tests, and the results are provided in Table 4. The listed percent values are in weight %, with the weight percentages of the fillers directly substituted in for the corresponding amount of Kaolin weight %.

TABLE 4

|  |  |  | Orientation of the flame |  |  |
|---|---|---|---|---|---|
| Formulation | Substrate | Approach | Front | Back | Edge |
| Ex. 2 | Radici 50 | Control - coating | Fail | Fail | Fail |
| Ex. 2 + 30% ATH | Radici 50 | coating on one side | Fail | Fail | Fail |
| Ex. 2 + 6% ammonium polyphosphate + 2% erythritol | Radici 50 | coating on one side | Fail | Fail | Fail |
| Ex. 2 + 5% exp graphite | Radici 50 | coating on one side | Pass | Fail | Fail |
| Ex. 2 + 5% exp graphite | Radici 50 | coating applied to both sides | Pass | Pass | Fail |

TABLE 4-continued

| Formulation | Substrate | Approach | Orientation of the flame | | |
|---|---|---|---|---|---|
| | | | Front | Back | Edge |
| Ex. 2 + 5% exp graphite | Radici 50 | coating penetrated through non-woven | Pass | Pass | Fail |
| Ex. 2 + 5% exp graphite | None | No substrate; only FR coating | Pass | Pass | Fail |

Alumina trihydrate, ammonium polyphosphate and expandable graphite are known as flame retardants. However, at the levels tested, they were unable to provide materials that passed the flame spread test from all directions. While expandable graphite was able to provide good results for surfaces to which the flame was applied, it could not provide flame retardance from the edge or from surfaces where there was no expandable graphite. The inventors surmise that the melt viscosity of the Polidisp 7602 polymer is too high to allow the coating layer to melt and run away from the flames. While the polypropylene substrate can melt in the flame, it is held in place by the unmelted coating layer, and thus remains to continue burning.

Example 3

Several latexes, with or without fillers, were coated onto the PP non-woven (Radici 50) (except as indicated). The latexes included styrene acrylic latex Aquamac 300 (from PCCR USA) or styrene acrylic latex Primal P-308 (from Dow), which were observed to melt more easily than the aforementioned Polidisp 7602. Data are provided in Table 5.

TABLE 5

| Entry | Latex | Filler Details (dry wt %) | Melt Viscosity (Pa s)[1] | | Front | Back | Edge | Permeance | | | |
|---|---|---|---|---|---|---|---|---|---|---|---|
| | | | | | | | | 25% | 45% | 75% | 95% |
| 1 | Polidisp 7602 | no filler | 200° C. | 4100 | Fail | Fail | Fail | | | | |
| | | | 250° C. | 2000 | | | | | | | |
| | | | 300° C. | 1100 | | | | | | | |
| 2 | Primal P-308 | no filler | 200° C. | 2100 | Pass | Pass | Pass | | | | |
| | | | 250° C. | 1200 | | | | | | | |
| | | | 300° C. | 220 | | | | | | | |
| 3 | Primal P-308 | 10% Kaolin | | | Pass | Fail | Pass | | | | |
| 4 | Primal P-308 | 5% Kaolin + 5% exp graph | | | Pass | NA | Pass | | | | |
| 5 | Primal P-308 | 25% ATH | 200° C. | 6300 | * | Fail | Pass | | | | |
| | | | 250° C. | 3200 | | | | | | | |
| | | | 300° C. | 180 | | | | | | | |
| 6 | Primal P-308 coated onto 1 mil PET film[2] | 25% ATH | | | * | Pass | Pass | | | | |
| 7 | Primal P-308 | 25% Kaolin | 200° C. | $22 \times 10^4$ | * | NA | Fail | | | | |
| | | | 250° C. | $11 \times 10^4$ | | | | | | | |
| | | | 300° C. | 33000 | | | | | | | |
| 8 | Primal P-308 | 20% Kaolin + 5% exp graph | | | * | Fail | Pass | | | | |
| 9 | Aquamac 300 | 25% ATH | | | * | Pass | Pass | | | | |
| 10 | Aquamac 300 | 25% Kaolin | | | * | Fail | Pass | | | | |
| 11 | Primal P-308 | 40% ATH | | | * | Pass | Pass | | | | |
| 12 | Aquamac 300 | 40% ATH | | | * | Pass | Pass | | | | |
| 13 | Aquamac 300 | 40% Kaolin | | | * | Fail | Fail | | | | |
| 14 | Aquamac 300 | 20% ATH + 20% Kaolin | | | * | Pass | Fail | | | | |
| 15 | Primal P-308 | 50% ATH | 200° C. | $19 \times 10^4$ | * | Pass | Fail | 2 | 3 | 5 | 8 |
| | | | 250° C. | 15000 | | | | | | | |
| | | | 300° C. | 7900 | | | | | | | |
| 16 | Primal P-308 | 60% ATH | | | * | Pass | Fail | | | | |
| 17 | Primal P-308 | 50% ATH + 10% Kaolin | | | * | Pass | Fail | 2 | 3 | 8 | 20 |
| 18 | Primal P-308 | 70% ATH | | | * | Pass | Fail | 2 | 3 | 5 | 8 |
| 19 | Primal P-308 | 50% ATH + 20% Kaolin | | | * | Fail | Fail | 1 | 3 | 16 | 66 |
| 20 | Primal P-308 | 50% Kaolin | 200° C. | ** | | | | | | | |
| | | | 250° C. | $14 \times 10^6$ | | | | | | | |
| | | | 300° C. | $18 \times 10^6$ | | | | | | | |

* Samples not tested for front pass, as it was the easiest of the tests to pass
** Unable to measure because sample was too viscous
[1] Melt viscosity as measured at temperature indicated and 1 rad/s
[2] This was not perforated, and was not breathable; a perforated film could be used to better provide desirable smart vapor retarding properties.

Figure 4:
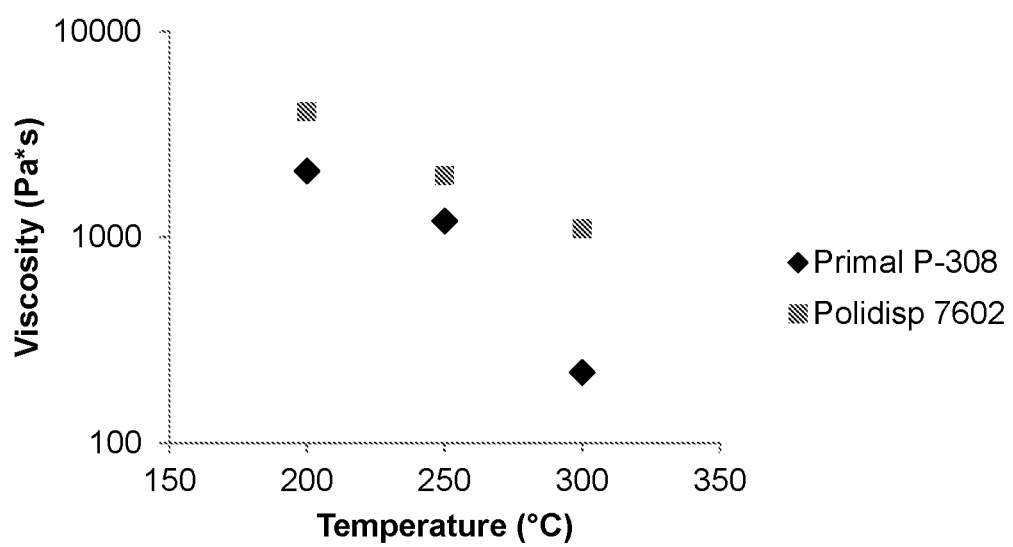
FIG. 4 illustrates the melt viscosity (Pa·s) measured between 200° C. and 300° C. for the compositions provided in Table 5, entry 1 (Polidisp 7602 without a filler) and Table 5, entry 2 (Primal P-308 without a filler).

Without intending to be bound by theory, the inventors believe that use of materials having lower melt viscosity of the polymeric coating layer, coated onto a building material substrate sheet having a melt viscosity as described herein, can be made to be especially flame retardant as the layers can melt and run away from flame in order to deny the fire the necessary fuel. For example, lower viscosity Primal P-308 (entry 2 in Table 5) performs better in the Euro Class E test than Polidisp 7602 (entry 1 in Table 5), which has higher viscosity than Primal P-308. In addition, as illustrated in FIG. 4, Primal P-308 also has a larger drop in viscosity at increasing temperatures compared to Polidisp 7602, and is thus able to melt and "run away" from the flame more efficiently than Polidisp 7602.

Various exemplary embodiments of the disclosure include, but are not limited to:

Embodiment 1 provides a flame retardant vapor retarding membrane, comprising
  a building material substrate sheet having a melt viscosity of about 1 Pa·s to about 100,000 Pa·s at measured at 300° C. and 1 rad/s; and
  a polymeric coating layer coated on the substrate sheet, the polymeric coating layer having a melt viscosity of about 1 Pa·s to about 100,000 Pa·s measured at 300° C. and 1 rad/s.

Embodiment 2 provides the flame retardant vapor retarding membrane of embodiment 1, configured to have a water vapor permeance of no more than about 2.5 Perm at 25% relative humidity (e.g., no more than about 1 Perm), as tested by ASTM E96 at 23° C.

Embodiment 3 provides the flame retardant vapor retarding membrane of embodiment 1 or 2, configured to have a water vapor permeance of at least about 5 Perms (e.g., at least about 8 Perms, at least about 12 Perms, at least about 15 Perms, or at least about 20 Perms) at 95% relative humidity, as tested by ASTM E96 at 23° C.

Embodiment 4 provides the flame retardant vapor retarding membrane of any of embodiments 1-3, configured to have a water vapor permeance of no more than about 6 Perms (e.g., no more than about 4 Perms) at 45% relative humidity, as tested by ASTM E96 at 23° C.

Embodiment 5 provides the flame retardant vapor retarding membrane of any of embodiments 1-4, configured to have a water vapor permeance in the range of about 5 Perms to about 18 Perms (e.g., about 5 Perms to about 12 Perms) at 75% relative humidity, as tested by ASTM E96 at 23° C.

Embodiment 6 provides the flame retardant vapor retarding membrane of any of embodiments 1-4, wherein the building material substrate sheet has a melt viscosity in the range of about 1 to about 10000 Pa·s, or about 1 to about 25,000 Pa·s, as measured at 300° C. and 1 rad/s.

Embodiment 7 provides the flame retardant vapor retarding membrane of any of embodiments 1-4, wherein the building material substrate sheet has a melt viscosity in the range of about 100 to about 10000 Pa·s, about 100 to about 25,000 Pa·s, as measured at 300° C. and 1 rad/s.

Embodiment 8 provides the flame retardant vapor retarding membrane of any of embodiments 1-4, wherein the building material substrate sheet has a melt viscosity in the range of about 10 Pa·s to about 100,000 Pa·s, or about 100 Pa·s to about 100,000 Pa·s, or about 1000 Pa·s to about 100,000 Pa·s, or about 10,000 Pa·s to about 100,000 Pa·s, or about 1 Pa·s to about 50,000 Pa·s, or about 10 Pa·s to about 50,000 Pa·s, or about 100 Pa·s to about 50,000 Pa·s, or about 1000 Pa·s to about 50,000 Pa·s, or about 1 Pa·s to about 25,000 Pa·s, or about 10 Pa·s to about 25,000 Pa·s, or about 100 Pa·s to about 25,000 Pa·s, or about 1000 Pa·s to about 25,000 Pa·s, or about 1 Pa·s to about 10,000 Pa·s, or about 10 Pa·s to about 10,000 Pa·s, or about 100 Pa·s to about 10,000 Pa·s, or about 1000 Pa·s to about 10,000 Pa·s, or about 1 Pa·s to about 1000 Pa·s, or about 10 Pa·s to about 1000 Pa·s, as measured at 300° C. and 1 rad/s.

Embodiment 9 provides the flame retardant vapor retarding membrane of any of embodiments 1-8, wherein the building material substrate sheet is a porous sheet.

Embodiment 10 provides the flame retardant vapor retarding membrane of any of embodiments 1-8, wherein the building material substrate sheet is a non-woven fabric, such as a non-woven polypropylene fabric, a nylon non-woven fabric, a poly(ethylene terephthalate) non-woven fabric, another polyester non-woven fabric, a polystyrene non-woven fabric, an acrylonitrile/butadiene/styrene copolymer non-woven fabric, or a polyethylene non-woven fabric.

Embodiment 11 provides the flame retardant vapor retarding membrane of any of embodiments 1-8, wherein the building material substrate sheet is a perforated thermoplastic film, e.g., a perforated polypropylene film, a perforated nylon film, a perforated PET film, a perforated polystyrene film, a perforated acrylonitrile/butadiene/styrene copolymer film, a perforated polyester film, or a perforated polyethylene film.

Embodiment 12 provides the flame retardant vapor retarding membrane of any of embodiments 1-11, wherein the polymeric coating layer has a melt viscosity in the range of about 1 to about 10,000 Pa·s, or about 100 Pa·s to about 25,000 Pa·s, as measured at 300° C. and 1 rad/s.

Embodiment 13 provides the flame retardant vapor retarding membrane of any of embodiments 1-11, wherein the polymeric coating layer has a melt viscosity in the range of about 100 to about 10,000 Pa·s, or about 100 Pa·s to about 25,000 Pa·s, as measured at 300° C. and 1 rad/s.

Embodiment 14 provides the flame retardant vapor retarding membrane of any of embodiments 1-11, wherein the polymeric coating layer has a melt viscosity in the range of about 10 Pa·s to about 100,000 Pa·s, or about 100 Pa·s to about 100,000 Pa·s, or about 1000 Pa·s to about 100,000 Pa·s, or about 10,000 Pa·s to about 100,000 Pa·s, or about 1 Pa·s to about 50,000 Pa·s, or about 10 Pa·s to about 50,000 Pa·s, or about 100 Pa·s to about 50,000 Pa·s, or about 1000 Pa·s to about 50,000 Pa·s, or about 1 Pa·s to about 25,000 Pa·s, or about 10 Pa·s to about 25,000 Pa·s, or about 100 Pa·s to about 25,000 Pa·s, or about 1000 Pa·s to about 25,000 Pa·s, or about 1 Pa·s to about 10,000 Pa·s, or about 10 Pa·s to about 10,000 Pa·s, or about 100 Pa·s to about 10,000 Pa·s, or about 1000 Pa·s to about 10,000 Pa·s, or about 1 Pa·s to about 1000 Pa·s, or about 10 Pa·s to about 1000 Pa·s, as measured at 300° C. and 1 rad/s.

Embodiment 15 provides the flame retardant vapor retarding membrane of any of embodiments 1-14, wherein the polymeric coating layer comprises a continuous organic phase, optionally with a particulate phase dispersed therein.

Embodiment 16 provides the flame retardant vapor retarding membrane of embodiment 15, wherein the continuous organic phase comprises a hydrophobic polymer.

Embodiment 17 provides the flame retardant vapor retarding membrane of embodiment 16, wherein the hydrophobic polymer is a styrene butadiene copolymer (e.g., styrene butadiene rubber), an acrylic polymer or copolymer such as a styrene acrylic polymer, a vinyl acetate/ethylene copolymer, a poly(vinylidene chloride) polymer or polymer, a poly(vinyl butyral), a polyolefin (such as a polyethylene, a polypropylene, a polybutadiene), or a combination thereof.

Embodiment 18 provides the flame retardant vapor retarding membrane of embodiment 16 or embodiment 17, wherein the hydrophobic polymer is coated onto the substrate sheet from an aqueous dispersion of the hydrophobic polymer dispersed in water, such as a polymer latex, or from an aqueous emulsion of the hydrophobic polymer.

Embodiment 19 provides the flame retardant vapor retarding membrane of embodiment 16, wherein the hydrophobic polymer is a styrene butadiene rubber (e.g., coated from a latex) or a styrene acrylic polymer (e.g., coated from a latex).

Embodiment 20 provides the flame retardant vapor retarding membrane of any of embodiments 16-19, wherein the hydrophobic polymer is present in the continuous organic phase of the polymeric coating layer in an amount of at least about 70 wt %, or at least about 85 wt %, based on the total weight of the continuous organic phase of the polymeric coating layer.

Embodiment 21 provides the flame retardant vapor retarding membrane of any of embodiments 16-20, wherein the hydrophobic polymer is present in the polymeric coating layer in an amount of about 15 wt % to about 90 wt %, or about 15 wt % to about 80 wt %, or about 15 wt % to about 65 wt %, or about 15 wt % to about 50 wt %, or about 15 wt % to about 35 wt %, or about 25 wt % to about 90 wt %, or about 25 wt % to about 80 wt %, or about 25 wt % to about 65 wt %, or about 25 wt % to about 50 wt %, or about 40 wt % to about 90 wt %, or about 30 wt % to about 90 wt %, or about 30 wt % to about 80 wt %, or about 30 wt % to about 65 wt %, or about 30 wt % to about 50 wt %, or about 40 wt % to about 90 wt %, or about 40 wt % to about 80 wt %, or about 40 wt % to about 65 wt %, or about 55 wt % to about 90 wt %, or about 55 wt % to about 80 wt %, or about 70 wt % to about 90 wt %.

Embodiment 22 provides the flame retardant vapor retarding membrane of any of embodiments 16-21, wherein the continuous organic phase further includes a lower molecular weight (i.e., less than 10 kDa) organic material, such as a wax or a low molecular weight polymer, having a melt viscosity less than or equal to the melt viscosity of the hydrophobic polymer, in an amount up to 15 wt %, up to 10 wt % or up to 5 wt % of the continuous organic phase.

Embodiment 23 provides the flame retardant vapor retarding membrane of any of embodiments 16-22, wherein the continuous organic phase further includes a polymeric hydrophilic component in an amount up to about 30 wt. %, e.g., in an amount up to 20 wt %, or up to 10 wt %, or in the range of 0.1 wt % to 30 wt %, or 0.1 wt % to 20 wt %, or 0.1 wt % to 1 wt %, or 1 wt % to 30 wt %, or 1 wt % to 20 wt %, or 1 wt % to 10 wt %, or 4 wt % to 30 wt %, or 4 wt % to 20 wt %, or 4 wt % to 10 wt %, of the continuous organic phase.

Embodiment 24 provides the flame retardant vapor retarding membrane of any of embodiments 16-22, wherein the continuous organic phase comprises less than about 4 wt %, or less than about 3 wt %, or less than about 2 wt %, or less than about 1 wt %, or less than about 0.5 wt %, or less than about 0.1 wt %, or is essentially free of polymeric hydrophilic components.

Embodiment 25 provides the flame retardant vapor retarding membrane of any of embodiments 15-24, wherein no particulate filler is present in the polymeric coating layer.

Embodiment 26 provides the flame retardant vapor retarding membrane of any of embodiments 15-24, wherein the particulate filler is present in the polymeric coating layer.

Embodiment 27 provides the flame retardant vapor retarding membrane of embodiment 26, wherein the particulate filler has a median particle size (i.e., d50, $50^{th}$ percentile particle size) of about 2 to about 10 μm.

Embodiment 28 provides the flame retardant vapor retarding membrane of embodiment 26, wherein the particulate filler has a d10 and a d90 value (i.e., 10th percentile particle size and 90th percentile particle size) within the range of about 0.3 to about 30 μm.

Embodiment 29 provides the flame retardant vapor retarding membrane of any of embodiments 26-28, wherein the particulate filler is an inorganic hydrophilic filler.

Embodiment 30 provides the flame retardant vapor retarding membrane of any of embodiments 26-28, wherein the particulate filler is alumina trihydrate.

Embodiment 31 provides the flame retardant vapor retarding membrane of any of embodiments 26-28, wherein the particulate filler is kaolin.

Embodiment 32 provides the flame retardant vapor retarding membrane of any of embodiments 26-28, wherein the particulate filler is alumina trihydrate, kaolin, graphite (e.g., nonexpendable graphite), expandable graphite, calcium carbonate, barium sulfate, talc, calcium sulfate, sodium sulfate, silica, magnesium hydroxide, magnesium carbonate, antimony trioxide, clay, zinc borate, zinc oxide, zinc hydroxystannate, boehmite, aluminium diethyl phosphinate, ammonium polyphosphate, ammonium phosphate, melamine polyphosphate, melamine phosphate, melamine cyanurate, melamine, decabromodiphenyl ethane, or a combination thereof.

Embodiment 33 provides the flame retardant vapor retarding membrane of any of embodiments 26-32, wherein the particulate filler is present in the polymeric coating layer in an amount up to about 85 wt %, e.g., up to about 75 wt %, or up to about 70 wt %, or up to about 60 wt %, or up to about 45 wt %, or up to about 30 wt %.

Embodiment 34 provides the flame retardant vapor retarding membrane of any of embodiments 26-32, wherein the particulate filler is present in the polymeric coating layer in an amount in the range of 10 wt % to about 85 wt %, or about 20 wt % to about 85 wt %, or about 35 wt % to about 85 wt %, or about 50 wt % to about 85 wt %, or about 65 wt % to about 85 wt %, or about 10 wt % to about 75 wt %, or about 20 wt % to about 75 wt %, or about 35 wt % to about 75 wt %, or about 50 wt % to about 75 wt %, or about 10 wt % to about 70 wt %, or about 20 wt % to about 70 wt %, or about 35 wt % to about 70 wt %, or about 50 wt % to about 70 wt %, or about 10 wt % to about 60 wt %, or about 20 wt % to about 60 wt %, or about 35 wt % to about 60 wt %, about 10 wt % to about 45 wt %, or about 20 wt % to about 45 wt %, or about 10 wt % to about 30 wt %.

Embodiment 35 provides the flame retardant vapor retarding membrane of any of embodiments 25-34, wherein the combined content of the particulate filler and the hydrophobic polymer is at least about 80% by weight of the polymeric coating layer, e.g., at least about 85 wt %, or at least about 90 wt %, or at least about 95 wt %, or at least about 97 wt %, or at least about 98 wt %, or at least about 99 wt %, or about 100 wt % of the polymeric coating layer.

Embodiment 36 provides the flame retardant vapor retarding membrane of any of embodiments 1-35, wherein the polymeric coating layer has a coat weight of at least about 10 g/m$^2$, for example, at least about 20 g/m$^2$, or even at least about 40 g/m$^2$.

Embodiment 37 provides the flame retardant vapor retarding membrane of any of embodiments 1-36, wherein the polymeric coating layer has a coat weight of no greater than about 1000 g/m$^2$, or even no greater than about 500 g/m$^2$.

Embodiment 38 provides the flame retardant vapor retarding membrane of any of embodiments 1-37, wherein the polymeric coating layer is partly embedded within the building material substrate sheet; or wherein the coating layer is embedded within the building material substrate sheet by about 5% to about 50% of the thickness of the polymeric coating layer.

Embodiment 39 provides the flame retardant vapor retarding membrane of any of embodiments 1-38, having a Flame Spread value of less than 150 mm, as measured by the flame test procedures of EN ISO 11925-2.

Embodiment 40 provides the flame retardant vapor retarding membrane of embodiment 39, wherein the membrane self-extinguishes after no more than 5 seconds after the flame is removed from the substrate.

Embodiment 41 provides the flame retardant vapor retarding membrane of any of embodiments 1-40, wherein the polymeric coating layer and the substrate sheet make up at least 80%, at least 90%, or even at least 99% of the thickness of the vapor retarding membrane.

Embodiment 42 provides the flame retardant vapor retarding membrane of any of embodiments 1-41, having a nail tear resistance of at least about 10 N/5 cm as measured according to EIN 12310-1.

Embodiment 43 provides the flame retardant vapor retarding membrane of any of embodiments 1-42, having a thickness in the range of about 5 microns to about 1000 microns.

Embodiment 44 provides a method for making a flame retardant vapor membrane of any of embodiments 1-43, the method comprising
  providing a building material substrate sheet having a melt viscosity of about 1 Pa·s to about 100,000 Pa·s at measured at 300° C. and 1 rad/s; and
  coating a polymeric coating layer onto the substrate sheet, the polymeric coating layer having a melt viscosity of about 1 Pa·s to about 100,000 Pa·s measured at 300° C. and 1 rad/s.

Embodiment 45 provides the method of embodiment 44, wherein the flame retardant vapor retarding membrane is configured to have a water vapor permeability of no more than about 2.5 Perm (e.g., no more than about 1 Perm) at 25% relative humidity as tested by ASTM E96 at 23° C.

Embodiment 46 provides the method of embodiment 44 or 45, wherein the flame retardant vapor retarding membrane is configured to have a water vapor permeability of at least about 5 Perms (e.g., at least about 8 Perms, at least about 12 Perms, at least about 15 Perms or at least about 20 Perms) at 95% relative humidity as tested by ASTM E96 at 23° C.

Embodiment 47 provides the method of any of embodiments 44-46, wherein coating the polymeric coating layer onto the substrate sheet includes providing a coating liquid comprising the hydrophobic polymer dispersed in a volatile liquid; coating the coating liquid onto the substrate sheet; and allowing the coated liquid to cure by drying to provide the polymeric coating layer.

Embodiment 48 provides the method of embodiment 47, wherein the coating liquid is coated onto the substrate sheet by rolling (e.g., forward roll, reverse roll), roll to roll coating, slot die coating, mayer rod coating, knife coating, indirect gravure coating, or spraying.

Embodiment 49 provides the method of embodiment 47 or embodiment 48, wherein the volatile liquid is water.

Embodiment 50 provides the method of any of embodiments 46-49, wherein the hydrophobic polymer is present in the coating liquid in the form of a polymer dispersion (e.g., a polymer latex).

Embodiment 51 provides the method of any of embodiments 46-49, wherein the hydrophobic polymer is present in the coating liquid in the form of a polymer emulsion.

Embodiment 52 provides a flame retardant vapor retarding membrane, comprising
  a building material substrate sheet having a melt viscosity of about 1 Pa·s to about 10000 Pa·s at measured at 300° C. and 1 rad/s; and
  a polymeric coating layer coated on the substrate sheet, the polymeric coating layer having a melt viscosity of about 1 Pa·s to about 10000 Pa·s measured at 300° C. and 1 rad/s.

Embodiment 53 provides the flame retardant vapor retarding membrane of embodiment 52, configured to have a water vapor permeance of no more than about 2.5 Perm (e.g., no more than about 1 Perm, or from about 0.1 Perm to about 2.5 Perm, or from about 0.5 Perm to about 2.5 Perm, or from about 0.1 Perm to about 1 Perm, or from about 0.3 Perm to about 1 Perm) at 25% relative humidity, as tested by ASTM E96 at 23° C., and having a thickness in the range of 5 microns to 1000 microns.

Embodiment 54 provides the flame retardant vapor retarding membrane of embodiment 52 or 53, configured to have a water vapor permeance of at least about 5 Perms (e.g., at least about 8 Perms, at least about 12 Perms, at least about 15 Perms, or at least about 20 Perms) at 95% relative humidity, as tested by ASTM E96 at 23° C.

Embodiment 55 provides the flame retardant vapor retarding membrane according to any of embodiments 52-54, wherein the building material substrate sheet is a non-woven fabric or a perforated sheet comprising polypropylene, nylon, poly(ethylene terephthalate), another polyester or copolyester, polystyrene, acrylonitrile/butadiene/styrene copolymer, or polyethylene.

Embodiment 56 provides the flame retardant vapor retarding membrane according to any of embodiments 51-54, wherein the building material substrate sheet has a melt viscosity of about 20 Pa·s to about 500 Pa·s, or in the range of about 200 Pa·s to about 5000 Pa·s, or about 200 Pa·s to about 10,000 Pa·s, or about 200 Pa·s to about 25,000 Pa·s, measured at 300° C. and 1 rad/s.

Embodiment 57 provides the flame retardant vapor retarding membrane according to any of embodiments 52-56, wherein the polymeric coating layer includes a continuous organic phase, optionally with a particulate phase dispersed therein, the continuous organic phase comprising a hydrophobic polymer in an amount of at least about 70 wt %, or at least about 85 wt %, based on the total weight of the continuous organic phase of the polymeric coating layer.

Embodiment 58 provides the flame retardant vapor retarding membrane according to any of embodiments 52-57, wherein the hydrophobic polymer is a styrene butadiene copolymer (e.g., a styrene butadiene rubber), an acrylic polymer or copolymer such as a styrene acrylic polymer, a vinyl acetate/ethylene copolymer, a poly(vinylidene chloride) polymer or copolymer, a poly(vinyl butyral), a polyolefin (such as a polyethylene, a polypropylene, or a polybutadiene), or a combination thereof.

Embodiment 59 provides the flame retardant vapor retarding membrane according to any of embodiments 52-58, wherein the hydrophobic polymer is coated onto the substrate sheet from an aqueous dispersion of the hydrophobic polymer dispersed in water, such as a polymer latex, or from an aqueous emulsion of the hydrophobic polymer.

Embodiment 60 provides the flame retardant vapor retarding membrane according to any of embodiments 52-59, wherein the continuous organic phase further includes a polymeric hydrophilic component in an amount up to about 30 wt. %, e.g., in an amount up to 20 wt %, or up to 10 wt %.

Embodiment 61 provides the flame retardant vapor retarding membrane according to any of embodiments 52-60, wherein the polymeric coating layer further includes a hydrophilic inorganic filler in an amount up to 85%, e.g., up to about 75 wt %, or up to about 70 wt %, or up to about 60 wt %, or up to about 45 wt %, or up to about 30 wt %.

Embodiment 62 provides the flame retardant vapor retarding membrane according to embodiment 61, wherein the hydrophilic inorganic filler is alumina trihydrate, kaolin, expandable graphite or a combination thereof.

Embodiment 63 provides the flame retardant vapor retarding membrane according to any of embodiments 52-62, wherein the polymeric coating layer has a melt viscosity of about 20 Pa·s to about 500 Pa·s, for example, about 200 Pa·s to about 5000 Pa·s, or about 200 Pa·s to about 10,000 Pa·s, or about 200 Pa·s to about 25,000 Pa·s, measured at 300° C. and 1 rad/s.

Embodiment 64 provides the flame retardant vapor retarding membrane according to any of embodiments 52-62, wherein the polymeric coating layer has a melt viscosity of about 10 Pa·s to about 10000 Pa·s, for example, about 100 Pa·s to about 10000 Pa·s, measured at 300° C. and 1 rad/s.

Embodiment 65 provides the flame retardant vapor retarding membrane according to any of embodiments 52-64, wherein combined content of the particulate filler and the hydrophobic polymer is at least about 80% by weight of the polymeric coating layer, e.g., at least about 85 wt %, or at least about 90 wt %, or at least about 95 wt %, or at least about 97 wt %, or at least about 98 wt %, or at least about 99 wt %, or about 100 wt % of the polymeric coating layer.

Embodiment 66 provides a method for making a flame retardant vapor membrane of any of embodiments 52-66, the method comprising
providing a building material substrate sheet having a melt viscosity of about 1 Pa·s to about 10000 Pa·s at measured at 300° C. and 1 rad/s; and
coating a polymeric coating layer onto the substrate sheet, the polymeric coating layer having a melt viscosity of about 1 Pa·s to about 10000 Pa·s measured at 300° C. and 1 rad/s.

Embodiment 67 provides the method of embodiment 66, wherein the flame retardant vapor retarding membrane is configured to have a water vapor permeance of no more than about 2.5 Perm (e.g., no more than about 1 Perm, or from about 0.1 Perm to about 2.5 Perm, or from about 0.5 Perm to about 2.5 Perm, or from about 0.1 Perm to about 1 Perm, or from about 0.3 Perm to about 1 Perm) at 25% relative humidity, as tested by ASTM E96 at 23° C., and the flame retardant vapor retarding membrane has a thickness in the range of 5 microns to 1000 microns.

Embodiment 68 provides the flame retardant vapor retarding membrane of embodiment 66 or 67, configured to have a water vapor permeance of at least about 5 Perms (e.g., at least about 8 Perms, or at least about 12 Perms, or at least about 15 Perms, or at least about 20 Perms) at 95% relative humidity, as tested by ASTM E96 at 23° C.

Embodiment 69 provides the method of any of embodiments 66-68, wherein coating the polymeric coating layer onto the substrate sheet includes providing a coating liquid comprising the hydrophobic polymer dispersed in a volatile liquid; coating the coating liquid onto the substrate sheet; and allowing the coated liquid to cure by drying to provide the polymeric coating layer.

Embodiment 70 provides the method of embodiment 69, wherein the volatile liquid is water.

Embodiment 71 provides the method of embodiment 69 or embodiment 70, wherein the hydrophobic polymer is present in the coating liquid in the form of a polymer dispersion (e.g., a polymer latex) or a polymer emulsion.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

What is claimed is:

1. A flame retardant vapor retarding membrane, comprising
a building material substrate sheet having a melt viscosity of about 1 Pa·s to about 1000 Pa·s at measured at 300° C. and 1 rad/s, the building material substrate sheet being a non-woven fabric or a perforated sheet; and
a polymeric coating layer coated on the substrate sheet, the polymeric coating layer having a melt viscosity of about 1 Pa·s to about 1000 Pa·s measured at 300° C. and 1 rad/s, wherein the polymeric coating layer includes a continuous organic phase, with a particulate hydrophilic inorganic filler dispersed therein in an amount of about 10 wt % to about 70 wt %, the particulate hydrophilic inorganic filler being aluminum trihydrate, kaolin, expandable graphite or a combination thereof, the continuous organic phase comprising a hydrophobic polymer in an amount of at least about 70 wt %, based on the total weight of the continuous organic phase of the polymeric coating layer.

2. The flame retardant vapor retarding membrane of claim 1, configured to have a water vapor permeance of no more than about 2.5 Perm at 25% relative humidity, as tested by ASTM E96 at 23° C., and having a thickness in the range of 5 microns to 1000 microns.

3. The flame retardant vapor retarding membrane of claim 2, configured to have a water vapor permeance of at least about 5 Perms at 95% relative humidity, as tested by ASTM E96 at 23° C.

4. The flame retardant vapor retarding membrane of claim 1, wherein the building material substrate sheet comprises polypropylene, nylon, poly(ethylene terephthalate), another polyester or copolyester, polystyrene, acrylonitrile/butadiene/styrene copolymer, or polyethylene.

5. The flame retardant vapor retarding membrane of claim 1, wherein the building material substrate sheet has a melt viscosity of about 10 Pa·s to about 1000 Pa·s, measured at 300° C. and 1 rad/s, and the polymeric coating layer has a melt viscosity of about 10 Pa·s to about 1000 Pa·s, measured at 300° C. and 1 rad/s.

6. The flame retardant vapor retarding membrane of claim 1, wherein the hydrophobic polymer is a styrene butadiene copolymer, an acrylic polymer or copolymer, a vinyl acetate/ethylene copolymer, a poly(vinylidene chloride) polymer or copolymer, a poly(vinyl butyral), a polyolefin, or a combination thereof.

7. The flame retardant vapor retarding membrane of claim 1, wherein the hydrophobic polymer is coated onto the substrate sheet from an aqueous dispersion of the hydrophobic polymer dispersed in water or from an aqueous emulsion of the hydrophobic polymer.

8. The flame retardant vapor retarding membrane of claim 1, wherein the continuous organic phase further includes a polymeric hydrophilic component in an amount up to about 30 wt %.

9. The flame retardant vapor retarding membrane of claim 1, wherein the continuous organic phase further includes a lower molecular weight organic material having a melt viscosity less than or equal to the melt viscosity of the hydrophobic polymer, in an amount up to 15 wt % of the continuous organic phase.

10. The flame retardant vapor retarding membrane of claim 1, wherein the particulate filler has a median particle size of about 2 to about 10 μm.

11. The flame retardant vapor retarding membrane of claim 1, wherein the particulate filler is aluminum trihydrate, kaolin or a combination thereof.

12. The flame retardant vapor retarding membrane of claim 1, wherein the combined content of the particulate filler and the hydrophobic polymer is at least about 80% by weight of the polymeric coating layer.

13. A method for making a flame retardant vapor membrane of claim 1, the method comprising
providing the building material substrate sheet; and
coating the polymeric coating layer onto the substrate sheet.

14. The method of claim 13, wherein coating the polymeric coating layer onto the substrate sheet includes providing a coating liquid comprising the hydrophobic polymer dispersed in a volatile liquid; coating the coating liquid onto the substrate sheet; and allowing the coated liquid to cure by drying to provide the polymeric coating layer.

15. The method of claim 14, wherein the volatile liquid is water.

16. The method of claim 14, wherein the hydrophobic polymer is present in the coating liquid in the form of a polymer dispersion or a polymer emulsion.

17. The flame retardant vapor retarding membrane of claim 1, wherein the particulate hydrophilic inorganic filler is 15-50 wt % kaolin and 50-85 wt % alumina trihydrate.

18. The flame retardant vapor retarding membrane of claim 1, wherein the building material substrate sheet has a melt viscosity of about 20 Pa·s to about 500 Pa·s, measured at 300° C. and 1 rad/s, and the polymeric coating layer has a melt viscosity of about 20 Pa·s to about 500 Pa·s, measured at 300° C. and 1 rad/s.

19. The flame retardant vapor retarding membrane of claim 1, wherein the polymeric coating layer comprises less than about 1 wt % of polymeric hydrophilic components.

20. The flame retardant vapor retarding membrane of claim 1, configured to have a water vapor permeance of no more than about 2.5 Perm at 25% relative humidity and a water vapor permeance of at least about 5 Perms at 95% relative humidity, as tested by ASTM E96 at 23 °C., wherein the building material substrate sheet comprises polypropylene, nylon, poly(ethylene terephthalate), another polyester or copolyester, polystyrene, acrylonitrile/butadiene/styrene copolymer, or polyethylene.

21. The flame retardant vapor retarding membrane of claim 20, wherein the building material substrate sheet has a melt viscosity of about 10Pa·s to about 1000Pa·s, measured at 300°C. and 1rad/s, and the polymeric coating layer has a melt viscosity of about 10 Pa·s to about 1000Pa·s, measured at 300 °C. and 1 rad/s.

22. The flame retardant vapor retarding membrane of claim 21, having a thickness in the range of 5 microns to 1000 microns.

* * * * *